United States Patent
Ariyoshi et al.

(10) Patent No.: US 6,886,176 B2
(45) Date of Patent: Apr. 26, 2005

(54) OPTICAL DISK DRIVE INCLUDING A FIRST BASE PORTION AND A MOVABLE SECOND BASE PORTION

(75) Inventors: Yuji Ariyoshi, Toyonaka (JP); Toru Tanaka, Kobe (JP); Masanao Wakikawa, Sakai (JP); Kiyoshi Ishioka, Hirakata (JP)

(73) Assignee: Matsushita Electric Industries Co., Ltd., Osaka-fu (JP)

( * ) Notice: Subject to any disclaimer, the term of this patent is extended or adjusted under 35 U.S.C. 154(b) by 0 days.

(21) Appl. No.: 10/424,849

(22) Filed: Apr. 29, 2003

(65) Prior Publication Data

US 2003/0193874 A1 Oct. 16, 2003

Related U.S. Application Data

(62) Division of application No. 09/494,654, filed on Jan. 31, 2000, now Pat. No. 6,741,536.

(30) Foreign Application Priority Data

Feb. 1, 1999 (JP) ............................................. 11-23833

(51) Int. Cl.⁷ .............................................. G11B 7/08
(52) U.S. Cl. ..................................................... 720/661
(58) Field of Search ................................ 720/661, 689, 720/690; 369/75.2

(56) References Cited

U.S. PATENT DOCUMENTS 4,679,182 A 7/1987 Kamoshita et al. ........ 369/77.2
4,755,978 A * 7/1988 Takizawa et al. ........ 369/30.94
6,141,310 A 10/2000 Tanaka et al. ............... 720/620
6,295,266 B1 9/2001 Lee et al. ................... 369/77.1
6,335,914 B2 1/2002 Tanaka et al. ............. 369/77.1

FOREIGN PATENT DOCUMENTS

| DE | 3319126 A1 | 12/1983 |
| DE | 36 01 831 | 7/1986 |
| DE | 198 22 755 | 1/1999 |
| EP | 0 174 629 | 3/1986 |
| GB | 2 121 989 | 1/1984 |
| JP | 3-49682 | 5/1991 |
| JP | 10003722 | 1/1998 |
| JP | 10112103 | 4/1998 |

* cited by examiner

Primary Examiner—David D. Davis
(74) Attorney, Agent, or Firm—Wenderoth, Lind & Ponack L.L.P.

(57) ABSTRACT

An optical disk drive includes a turntable, a first motor for turntable drive, an optical pickup and a drive mechanism arranged on a drive base and a separate traverse base that floats on the drive base. A loading drive mechanism drives a disk loading mechanism. A second motor can be driven in forward and reverse directions to supply drive power to the loading drive mechanism and a pickup drive mechanism. A drive power transfer path switching mechanism is used to switch the path through which drive power from the second motor is transferred to supply power to the loading drive mechanism and pickup drive mechanism. By continuously driving the second motor in one direction, then moving the optical pickup, raising or lowering the turntable, and transporting a disk can be accomplished in this sequence substantially continuously. By reversing the direction of motor drive, these operations can be accomplished substantially continuously in reverse direction in reverse sequence.

7 Claims, 31 Drawing Sheets

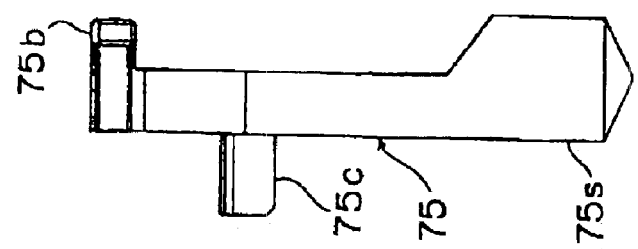
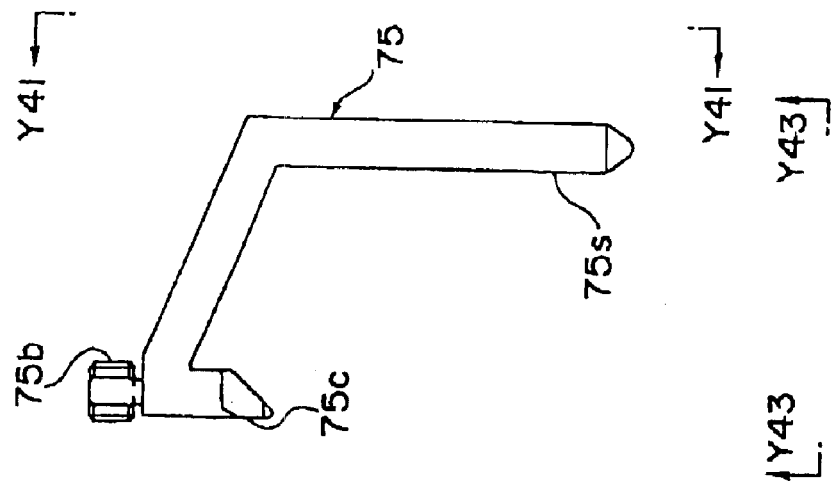
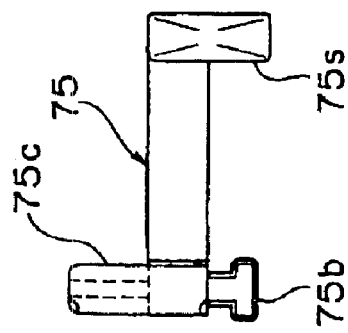

OPTICAL DISK DRIVE INCLUDING A FIRST BASE PORTION AND A MOVABLE SECOND BASE PORTION

This application is a Divisional of application of Ser. No. 09/494,654 filed Jan. 31, 2000 now U.S Pat. No. 6,741,536, currently pending.

BACKGROUND OF THE INVENTION

The present invention relates to an optical disk drive, also referred to herein as simply a disk drive, for recording a data signal and/or reproducing a data signal recorded to an optical disk, also referred to herein as simply a disc, used as a data storage medium. A Compact Disc or CD is exemplary of such data storage media.

A disk drive typical of those related to the present invention has an opening on the front panel through which a disk tray opens and closes. After the tray is opened and a disk is loaded onto the tray, the tray is automatically closed, that is, retracted into the disk drive to a turntable.

When a disk is loaded into this type of disk drive it is held between the turntable and a clamp and driven at a specific rotational speed so that data signals recorded to the disk can be read by the disk drive, that is recording or reproducing apparatus, during a read operation, for example. More specifically, signals are recorded to tracks within a specific area of the disk, and an optical pickup for signal reading is driven according to the track address of the desired signal so that the desired signal can be reproduced.

This type of disk drive has three basic operations that require drive motor power: (1) disk loading whereby the tray is driven in two directions between a disk loading/unloading position outside the disk drive at which a disk can be placed on or removed from the tray, and a loading/unloading position inside the disk drive at which the disk is loaded to or unloaded from the turntable; (2) disk driving whereby the turntable is driven to spin a disk; and (3) pickup driving whereby an optical pickup is driven primarily between positions at the outside circumference and inside circumference of the disk.

Typical disk drives according to the related art have also used separate motors, that is, three individual motors, as the drive source for these three operations.

This problem of needing three motors was partially addressed by a disk player (disk drive) as taught in Japanese Utility Model Laid-Open Publication No. 3-49682. This disk player reduced the number of required motors to two, that is, driving a single loading motor in forward and reverse directions for disk loading and unloading, disk chucking, and pickup drive.

A disk drive according to the related art typically comprises a case and a chassis essentially integrated with the case, a turntable fixed to the chassis, and the drive motors. That is, because the vertical position of the turntable is fixed, the disk must be moved vertically for disk loading and unloading in order to avoid interference with the turntable. In addition, the clamping means (chucking plate) must be driven vertically in order to clamp the disk to the turntable.

A disk holder for lifting the disk is therefore provided at the disk holding surface of the tray in a conventional disk drive. The disk holder is then rotated up or down timed to the tray movement so as to avoid interference between the disk and turntable during disk loading and unloading. A chucking plate is further provided supported by a chucking arm on the fixed chassis so that the chucking plate can rotate and move vertically. This chucking plate is rotated up or down according to the disk loading and unloading timing to either clamp the disk to the turntable or to release the disk. Drive construction and operating the component parts are thus quite complicated and disadvantageous with respect to simplifying drive construction and achieving good stable operation.

Furthermore, all drive parts other than the tray and associated drive system are also provided on the fixed chassis in this conventional disk drive. In addition, these parts are rigidly attached or supported on the fixed chassis. As a result, any impact, shock, or vibration to which the disk player is exposed is also transmitted directly from the fixed chassis to the various rigidly attached drive parts. These parts are thus easily susceptible to major damage. This design is therefore disadvantageous with respect to improving the durability of the disk drive to the effects of external forces, that is, resistance to shock and vibration.

Rigid attachment of these components to the fixed chassis also makes it necessary to extremely precisely position these components relative to each other. Extremely high precision is therefore required in both parts manufacture and assembly. When the need to mass produce these components is considered, this need for extremely high precision is disadvantageous with respect to increasing productivity.

Considering these problems of the related art, the basic object of the present invention is therefore to provide an optical disk drive whereby the number of motors used can be reduced, construction can be simplified, durability and resistance to shock and vibration can be improved, and productivity can be improved in mass production.

SUMMARY OF THE INVENTION

To achieve this object, an optical disk drive according to a first aspect of the present invention has a turntable for rotatably supporting an optical disc, an optical pickup for writing a data signal to an optical disc rotating on the turntable or reading a data signal recorded to the optical disc, a pickup drive mechanism for moving the optical pickup bidirectionally between the inside circumference side and outside circumference side of the optical disc, and a disk loading mechanism for moving an optical disc bidirectionally between a first position at which the optical disc is above the turntable, and a second position at which the optical disc is outside the disk drive, a first base comprising a base frame of the disk drive, and a second base separate from the first base. The second base is supported to move or swing vertically relative to the first base, and has connected thereto the turntable and a first motor for rotationally driving the turntable, and the optical pickup and pickup drive mechanism. On the first and/or second base are: a loading drive mechanism for driving said disk loading mechanism; a second motor that can be driven in forward and reverse directions for supplying drive power to the loading drive mechanism and pickup drive mechanism; and a drive power transfer path switching mechanism for switching the drive power transfer path of the second motor between a path transferring power to the loading drive mechanism and a path transferring power to the pickup drive mechanism. Thus comprised, moving the optical pickup, raising or lowering the turntable, and moving the optical disc can be substantially continuously performed in this sequence by driving the second motor continuously in a first direction of rotation. These operations can be performed in reverse direction in reverse sequence substantially continuously by driving the second motor continuously in reverse of this first direction of rotation.

A separate second base is thus supported on a first base such that the second base can move or swing in a circular path vertically relative to the first base. A single motor (the above-noted second motor) can also be driven continuously forward (in a first direction of rotation) or in the opposite direction to move the optical pickup, raise or lower the turntable, and move the optical disc substantially continuously in this sequence, or substantially continuously in reverse direction in reverse sequence.

In an optical disk drive according to a second aspect of the present invention, the second base is disposed inside an opening in the first base, and is supported so that it can swing vertically pivoting around one end thereof relative to the first base. The first base comprises thereon a cam gear disposed near the other end side of the second base, and the cam gear has on an outside surface thereof a cam channel for raising and lowering the other end of the second base. The loading drive mechanism has a loading drive gear set containing a plurality of gears including a final output gear. The final output gear of the loading drive gear set engages an outside teeth part of the cam gear to rotate the cam gear and thereby raise or lower the other side of the second base.

In an optical disk drive according to this aspect, the cam gear is rotated by drive power transferred from the loading drive gear set, and the other end side of the second base is raised or lowered in conjunction with cam gear rotation. As a result, the second base is swung up or down to the first base pivoting around the one end side of the second base.

In an optical disk drive according to a third aspect of the present invention, the profile of the outside gear part of the cam gear as seen in longitudinal section is an arc or a line approaching the arc. This arc follows a path of vertical circular motion through which the final output gear of the loading drive gear set travels in conjunction with the swinging movement of the second base.

In this case the final output gear of the loading drive gear set positively engages the outside gear part of the cam gear when the final output gear swings up or down in conjunction with the swinging movement of the second base.

In an optical disk drive according to a fourth aspect of the present invention, a protrusion is arranged at the other end side of the second base, and this other end side of the second base is positioned vertically as a result of this protrusion engaging a cam channel in the cam gear.

In this optical disk drive, vertical positioning of the other end side of the second base to the first base is reliably determined by engagement of the protrusion and cam channel.

In an optical disk drive according to a fifth aspect of the present invention, the disk loading mechanism comprises a tray drive gear for driving the tray on which a disk is placed. When the second base swings downward to a specific position relative to the first base, the outside gear part of the cam gear engages the tray drive gear.

In this optical disk drive, the tray is driven after the second base has positively swung down from the first base.

In an optical disk drive according to a sixth aspect of the present invention, the pickup drive mechanism comprises a feed rack for moving the optical pickup, and a rack drive gear set comprising a plurality of gears for driving the feed rack.

After moving the optical pickup to an inside circumference edge position of the data signal recording area of the optical disc, the feed rack can be moved to a specific position farther to the inside circumference side of the disc. By moving to this specific position at the inside circumference side and engaging the drive power transfer path switching mechanism, the second motor drive power transfer path is switched from a path to the pickup drive mechanism to a path transferring power to the loading drive mechanism. By moving from the specific position at the inside circumference side to the outside circumference side of the disc and thereby disengaging from the drive power transfer path switching mechanism, the second motor drive power transfer path is switched from a path transferring power to the loading drive mechanism to a path transferring power to the pickup drive mechanism.

In this optical disk drive the drive power transfer path of the second motor can be automatically switched as a result of the feed rack moving to this specific position to the inside circumference side of the disk after moving the optical pickup to an inside circumference edge of the data signal recording area of the optical disc, and again when the feed rack moves from this specific position toward the outside circumference side of the disk.

In an optical disk drive according to a seventh aspect of the present invention, a regulating rod retractable from the other end side is arranged at the second base, and a positioning channel that can be engaged by this regulating rod is arranged in the first base. The feed rack engages the regulating rod when it moves from the one end side to the other end side of the second base and reaches a specific position. The regulating rod protrudes from the other end side of the second base and fits into the positioning channel when the feed rack moves further toward the other end side after engaging the regulating rod, thereby positioning the second base to the first base in a lateral direction perpendicular to the direction of feed rack travel.

In this optical disk drive, the regulating rod is driven to project from the other end side of the second base as a result of the feed rack moving beyond a specific position to the other end side. The regulating rod thus fits into the positioning channel in the first base, and thereby determines the lateral position of the second base to the first base perpendicular to the direction of feed rack travel.

In an optical disk drive according to an eighth aspect of the present invention, the cam gear comprises a hook part projecting to the outside, and the second base comprises on a surface thereof a curved channel parallel to an outside part of the cam gear. The hook part engages this curved channel to position the second base at the first base in the direction of feed rack travel.

As a result of the cam gear hook part engaging this curved channel, the second base is positioned at the first base in the direction of feed rack travel.

In an optical disk drive according to a ninth aspect of the present invention, an elastic damping member is arranged at a support part for supporting the one end side of the second base at the first base, and at a support part for supporting the cam gear to the first base. The second base is thus supported in a floating state on the first base within the range of elasticity of the damping members.

The second base is therefore not rigidly supported on the first base, but is instead supported so as to float on the first base within limits determined by the flexibility of the damping members.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 41 is a side view of the rocker lever through line Y41—Y41 in FIG. 42;

FIG. 42 is a plan view of the rocker lever of the drive mechanism; and

FIG. 43 is a side view of the rocker lever through line Y43—Y43 in FIG. 42.

DETAILED DESCRIPTION OF THE INVENTION

Figure 1:
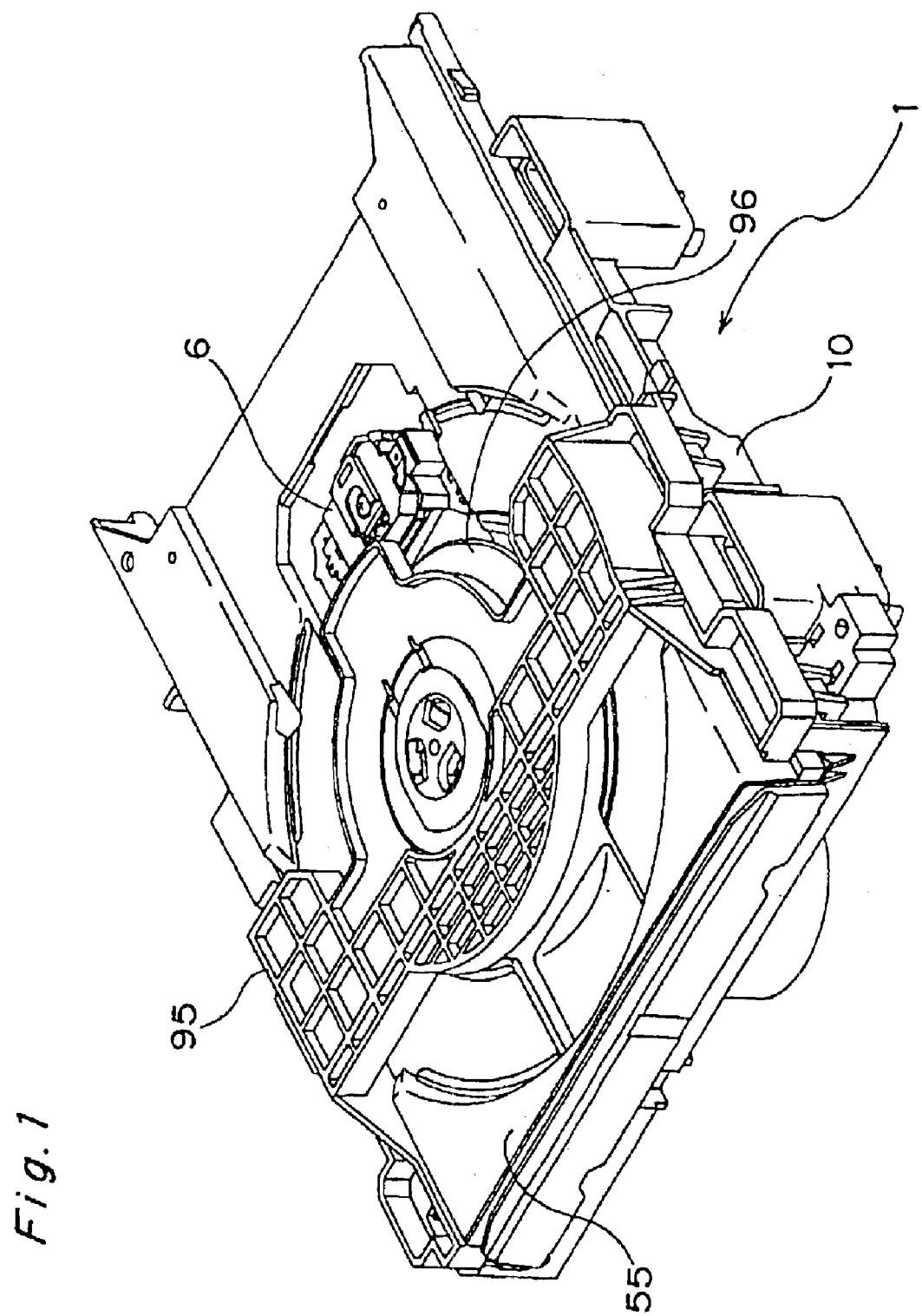
FIG. 1 is an overall perspective view of the assembled optical disk drive according to a preferred embodiment of the present invention.
Figure 2:
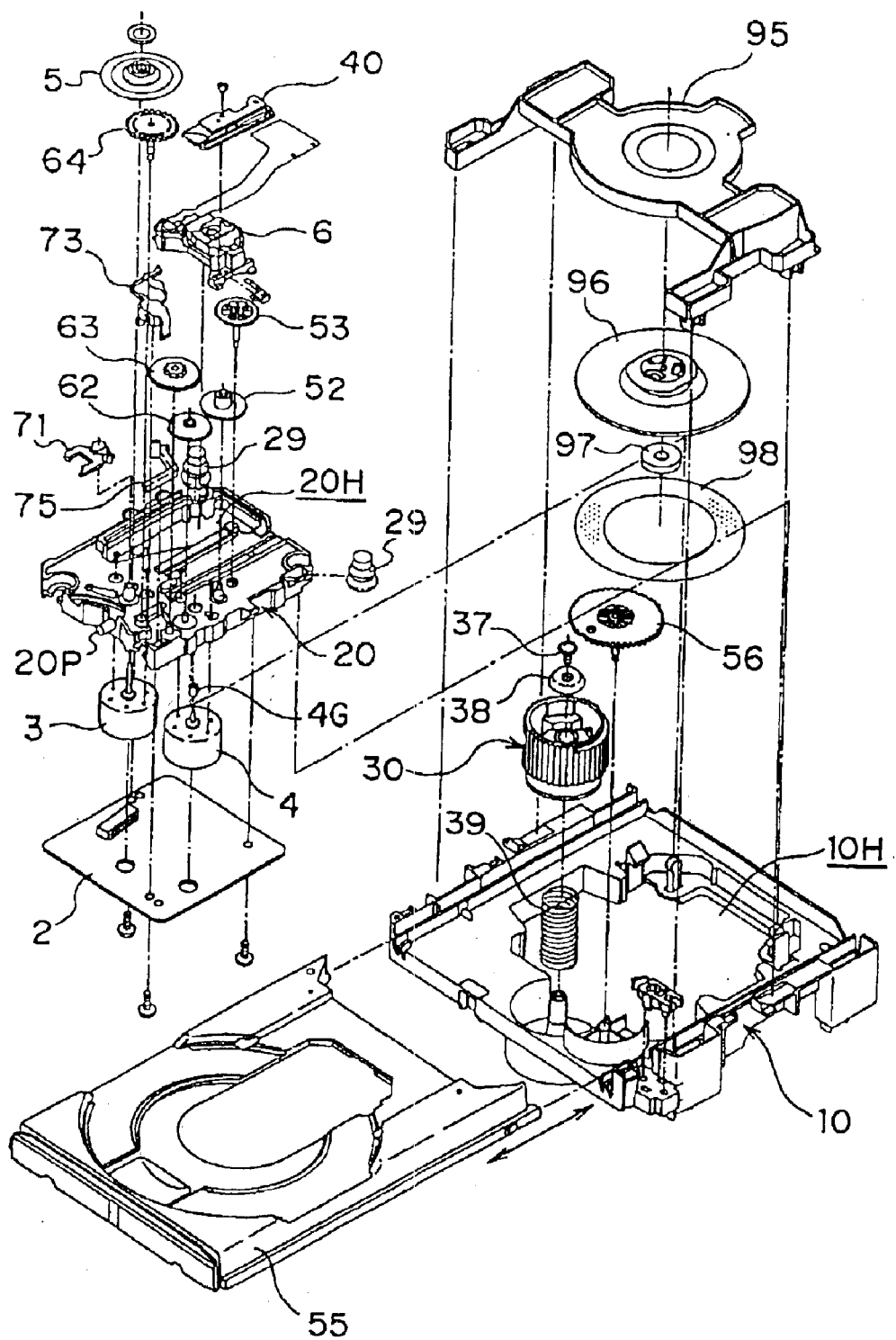
FIG. 2 is an exploded view of the disk drive shown in FIG. 1.
Figure 3:
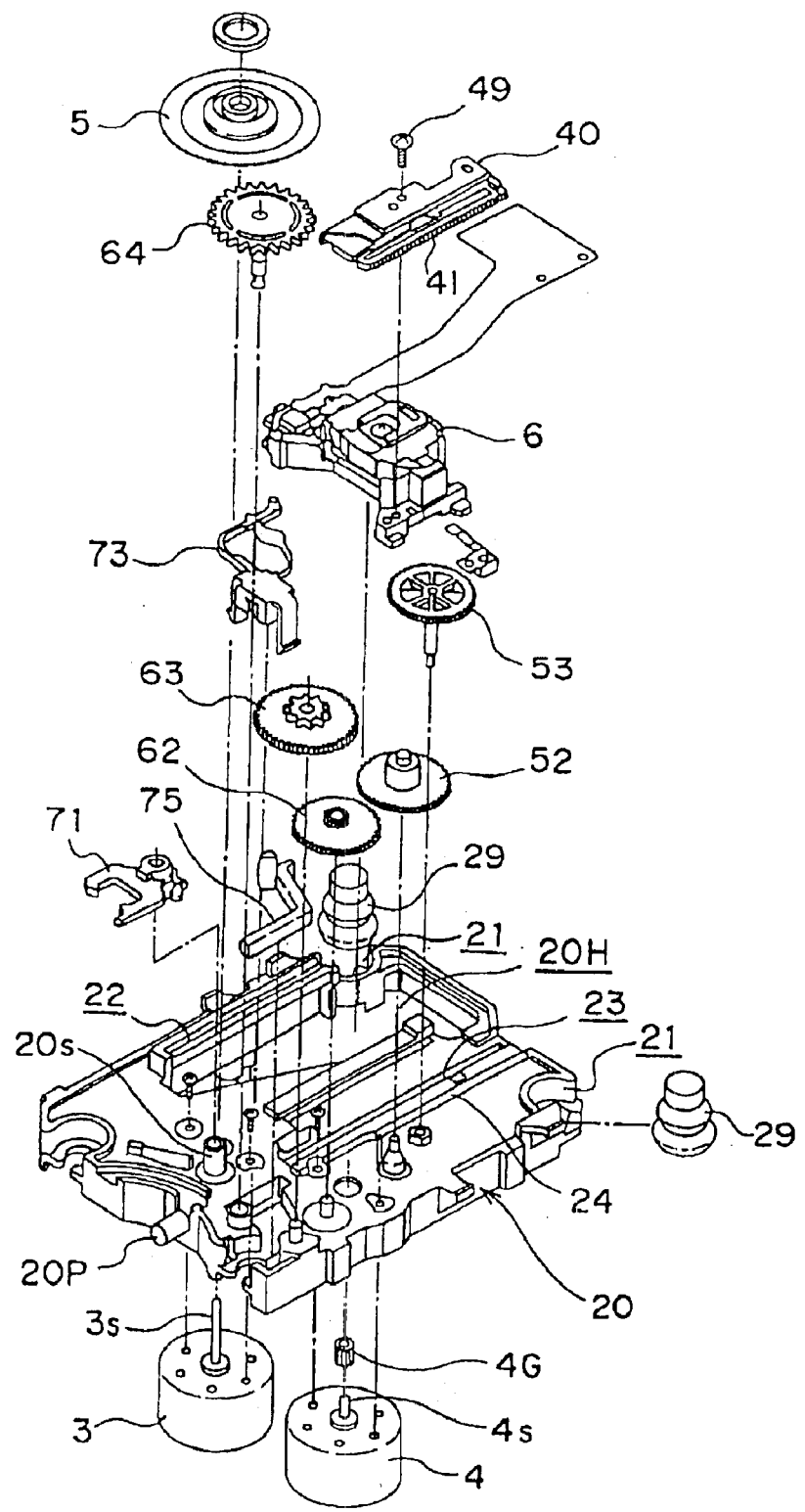
FIGS. 3 and 4 are enlarged views of parts of FIG. 2.
Figure 4:
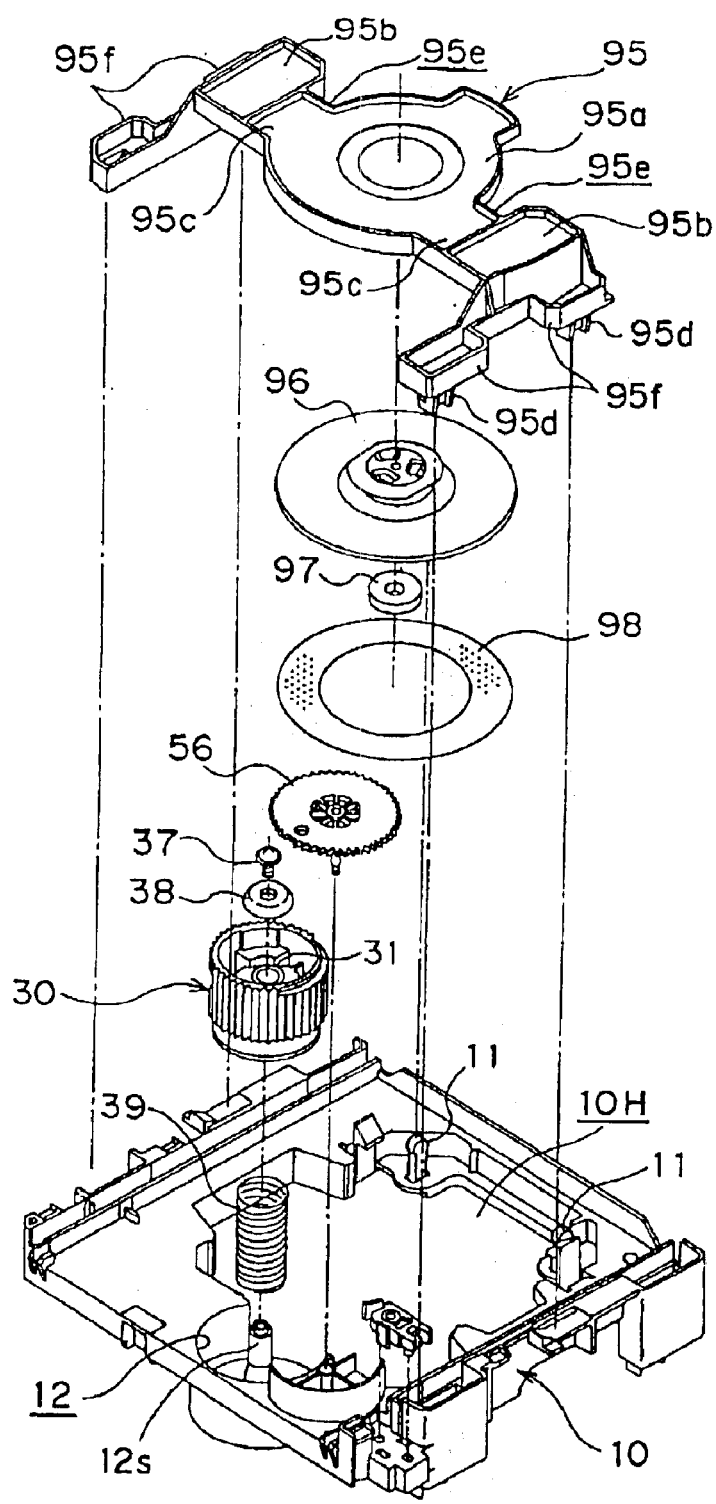

The preferred embodiments of the present invention are described below with reference to the accompanying figures. FIG. 1 is an overall perspective view of the assembled optical disk drive according to a preferred embodiment of the present invention. FIG. 2 is an exploded view of the disk drive shown in FIG. 1, and FIGS. 3 and 4 are enlarged views of parts of FIG. 2.

It should be noted that the terms "optical disk drive", "disk drive", and simply "drive" are used synonymously throughout this specification.

As will be known from these figures, an optical disk drive 1 according to this preferred embodiment comprises a drive base 10 as the installation base for major components of the drive 1, and a traverse base 20 as the support base for supporting the major part of the disk drive's drive mechanism.

The overall shape of the drive base 10 is a substantially square frame when seen in plan view. The traverse base 20 is arranged in an internal space 10H in the drive base 10.

It should be noted that the drive base 10 and traverse base 20 correspond respectively to the first base and second base in the accompanying claims.

A disc used as the data storage medium, such as a Compact Disc (CD), is placed on a tray 55 in this disk drive 1. The tray 55 transports a disk placed thereon bidirectionally along the frame of drive base 10. The path of the tray 55 is diagonal as seen in FIG. 1 and FIG. 2 and indicated by the arrow in FIG. 2. Thus, when a disk is removed from inside the disk drive 1 (that is, the disk is ejected), the tray 55 travels diagonally downward to the left as seen in FIG. 1 and FIG. 2, and when the disk is loaded from outside into the disk drive 1 (that is, the disk is inserted), the tray 55 travels diagonally upward to the right as seen in FIG. 1 and FIG. 2.

It should be noted that the side of the disk drive 1 from which the disk, that is, the tray 55, is removed from inside the disk drive 1 (the diagonal lower left side in FIGS. 1 and 2) is hereafter referred to as the front of the drive 1, and the side of the drive 1 to which the disk is inserted (the diagonal upper right side in FIGS. 1 and 2) is hereafter referred to as the back of the drive 1. The top and bottom of the drive 1 as seen in FIGS. 1 and 2 are also referred to hereafter as the top and bottom sides.

A pair of right and left traverse base support studs 11 is disposed vertically at the back of the drive base 10 (that is, at the top right in FIG. 1 and FIG. 2). A notch 21 is formed at each back corner of the traverse base 20. An elastic, typically rubber, bushing 29 (floating bushing) is fit into each notch 21. By fitting these bushings 29 on the above-noted traverse base support studs 11, the back of the traverse base 20 is supported such that it can pivot in a vertical direction with respect to the drive base 10 centering on a horizontal line Lh (see FIG. 5) between the centers of the tips of the right and left traverse base support studs 11.

The back of the traverse base 20 is also supported by means of the right and left bushings 29 so that the traverse base 20 can float relative to the drive base 10 within a specific range as enabled by the flexibility of the bushings 29. It should be noted that the right and left bushings 29 are not shown in FIG. 5 so that the traverse base support studs 11 and notches 21 can be clearly seen.

Figure 8:
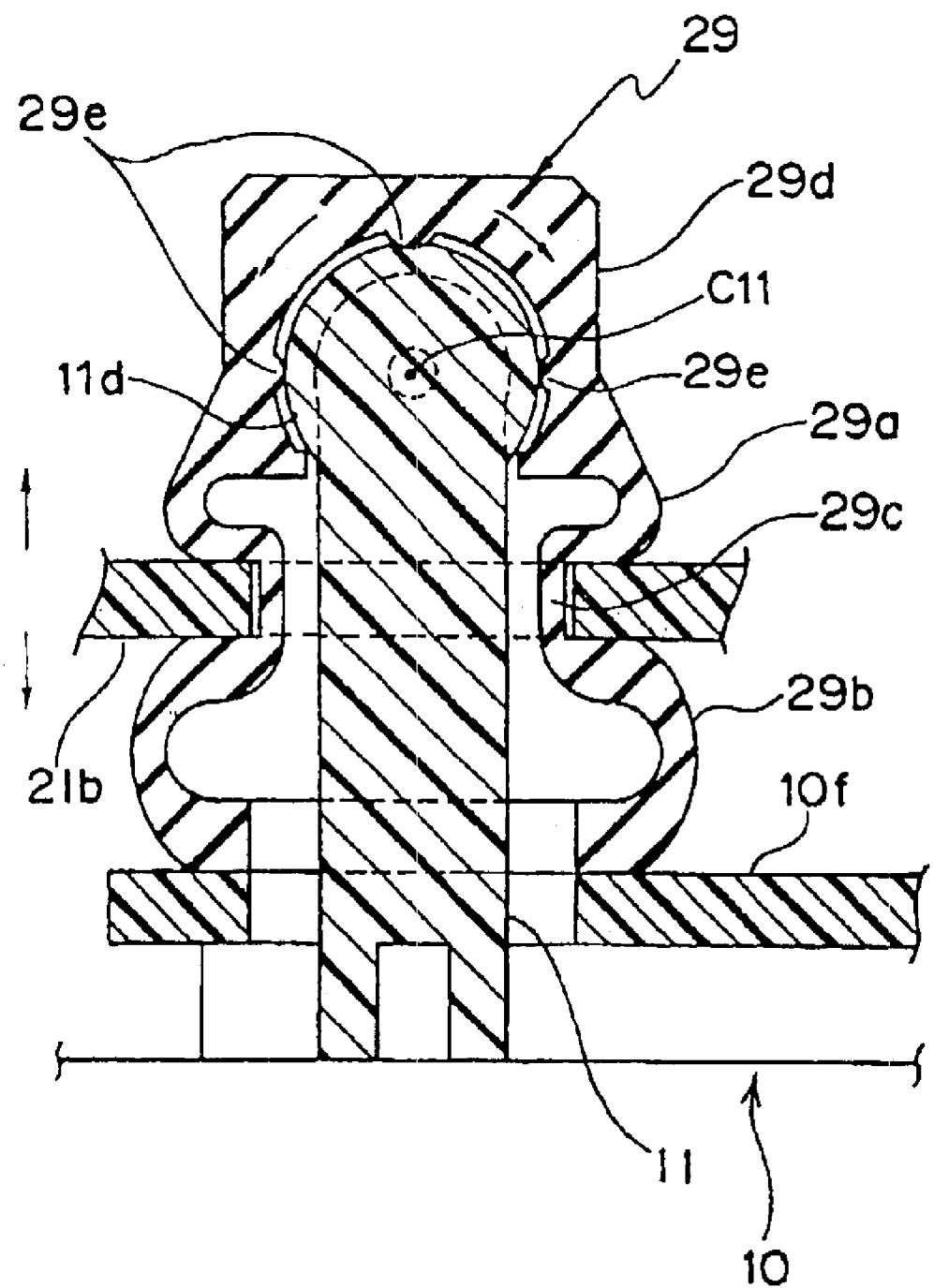
FIG. 8 is an enlarged vertical section view of the floating bushing fit to the traverse base.

These bushings 29 are described in detail next with reference to FIG. 8. The bushings 29 are an integral hollow body molding with one end closed and the other end open. Each bushing 29 also has relatively large diameter first and second damping parts 29a and 29b in sequence along the long axis of the bushing 29, and a relatively small diameter fitting part 29c (first fitting part) between the two damping parts.

This first fitting part 29c thus forms a constricted neck between damping parts 29a and 29b, and is the part that is fit to the traverse base 20 as the first member to be supported in a floating state by the floating bushings 29. More specifically, each bushing 29 is installed at a notch 21 in a rear corner of the traverse base 20 by fitting the outside circumference of the first fitting part 29c into the hole of a bushing mounting flange 21b in the notch 21.

A second fitting part 29d for closing the cavity inside the floating bushing 29 is integrally formed at the terminal side of the first damping part 29a. This second fitting part 29d is the part that is fit to the drive base 10, which is the second member to be floatably supported by the bushings 29. More specifically, this second fitting part 29d is fit to the end 11d of the traverse base support stud 11.

The terminal side of the second damping part 29b is open. The traverse base support stud 11 is inserted into the floating bushing 29 from this opening. The terminal part of the second damping part 29b contacts the bushing support surface 10f of the drive base 10.

Preferably, the back of the traverse base 20 is assembled to the drive base 10 by way of bushings 29 such that the terminal part of the second damping part 29b contacts bushing support surface 10f with a certain flexibility when in a normal state. As used herein, this normal state is that in which only the normal weight of the traverse base 20 and components mounted thereon acts on the bushings 29.

When vibration is applied to the disk drive 1 when the drive 1 is in use or during manufacture and force is thus applied causing relative movement between the drive base 10 and traverse base 20, the damping action accompanying compressive deformation within the flexibility limits of the second damping part 29b effectively absorbs vibration components from the downward movement (that is, in the direction in which the bushing mounting flange 21b approaches the bushing support surface 10f) of the back of the traverse base 20.

It should be noted that contact between the terminal end of the second damping part 29b and the bushing support surface 10f in this normal state is not necessarily a prerequisite for achieving this vibration damping effect from the second damping part 29b. A gap between this terminal end and the bushing support surface 10f simply reduces the vibration damping effect an amount equivalent to the gap, and when the relative movement between the drive base 10 and traverse base 20 exceeds this gap, the vibration damping effect is equivalent to how much this relative movement exceeds the gap.

When the back of the traverse base 20 moves downward, the bushing mounting flange 21b moves away from the end 11d of traverse base support stud 11, the top of the second fitting part 29d becomes suspended on the end 11d of traverse base support stud 11, and the first damping part 29a is stretched and deformed within its flexibility limit.

Vibration can therefore be absorbed both by the damping effect of the stretch deformation of the first damping part 29a and the damping effect of the compressive deformation of second damping part 29b. Extremely effective vibration absorption can thus be achieved.

The second fitting part 29d is part of the typically rubber floating bushing 29 and is therefore quite flexible. The flexibility of this second fitting part 29d therefore makes it possible to further improve the vibration damping effect and noise suppression when a force causing relative movement between the drive base 10 and traverse base 20 is applied.

It should be further noted that the second fitting part 29d of the floating bushing 29 can be formed so as to not completely enclose the one end (top) of the internal cavity of the floating bushing 29. More specifically, the second fitting part 29d can have an opening insofar as the end 11d of the traverse base support stud 11 does not pass completely through the opening when a force lifting the traverse base support stud 11 toward the opening is applied.

Vibration components whereby the back of the traverse base 20 moves upward (that is, such that the bushing mounting flange 21b moves closer to the end 11d of traverse base support stud 11) can be effectively absorbed by the damping effect accompanying the compressive deformation of the first damping part 29a within the flexibility limits of the first damping part 29a.

Lateral vibration components parallel to the base surface, such as vibration components in the front-back direction or side to side direction of the traverse base 20, are absorbed by lateral deformation of the floating bushing 29 within its flexibility limit.

The end 11d of traverse base support stud 11 is preferably shaped such that, when seen in a vertical section view, the shape of the outside edge is semi-circular. In this case, the shape of the inside edge of the second fitting part 29d of the floating bushing 29 as seen in a vertical section view is also semi-circular. Thus, the second fitting part 29d, that is, the entire floating bushing 29, can move circularly around center C11 of the traverse base support stud end 11d. The axis of movement Lh (see FIG. 5) when the traverse base 20 pivots up or down relative to the drive base 10 is a straight line joining centers C11 of the ends 11d of the right and left traverse base support studs 11.

Yet further preferably, there is a specific gap between the inside circumference of the second fitting part 29d and the outside circumference of the end 11d of traverse base support stud 11, and a plurality of protrusions 29e are formed in the second fitting part 29d. These protrusions 29e are directed toward the center of the inside circumference of second fitting part 29d, and therefore to the center C11 of support stud end 11d when the traverse base support stud 11 is fit into the floating bushing 29.

That is, second fitting part 29d of floating bushing 29 is fit onto the end 11d of traverse base support stud 11 through intervening protrusions 29e, and a specific gap is thus maintained between the second fitting part 29d and end 11d. As a result, the second fitting part 29d can move extremely smoothly circularly with respect to the end 11d of traverse base support stud 11.

The floating bushing 29 thus comprises first and second damping parts 29a and 29b, and first and second fitting parts 29c and 29d. It is therefore possible to provide a simple, space-saving, low cost floating means that can support the entire weight of the traverse base 20, and effectively absorb vibration while preventing the traverse base 20 from slipping vertically out of place, when the traverse base 20 vibrates.

Furthermore, by providing a center of rotation part, an accurate center of circular movement can be assured without providing another center for circular movement.

The disk drive includes a rasing and lowering mechanism for supporting second base 20, as explained below. As will also be known from FIG. 4 and FIG. 5, a recess 12 (of which the shape of the perimeter is semi-circular) is formed at the front edge part of internal space 10H in drive base 10. A spindle 12s is vertically disposed in the bottom center of this recess 12. The center boss 31 of a substantially cylindrical cain gear 30 is fit so that it can rotate freely on this spindle 12s. A coil spring 39 (floating spring) is disposed between the bottom of this cam gear 30 and the bottom of recess 12 in drive base 10. The center boss 31 of the cam gear 30 is passed over the spindle 12s, and a set screw 37 is screwed through a flexible collar 38 (floating collar) into the end of the spindle 12s.

The cam gear 30 is therefore housed in recess 12 of drive base 10 with the top and bottom held between elastic members 38 and 39, that is, with the bottom of the cam gear 30 supported by coil spring 39 and the top held by the floating collar 38. As a result, the cam gear 30 is supported on the drive base 10 in a manner enabling the cam gear 30 to float (in a floating state) within specific limits, that is, within the flexibility limits of the floating collar 38 and floating spring 39.

It should be noted that the floating collar 38, floating spring 39, and right and left floating bushings 29 correspond to the damping members noted in the accompanying claims.

It should be further noted that the floating bushing 29 and floating collar 38 shall not be limited to rubber materials. For example, a soft resin or other suitable material with a specific flexibility can be alternatively used.

The raising and lowering mechanism including the cam gear 30 is described in detail next with reference to FIGS. 24 to 29. The cam gear 30 comprises on its outside surface a plurality of teeth 30g (external teeth) parallel to the longitudinal axis Lg of the cam gear 30, and a cam channel 33 having top and bottom horizontal channels 33a and 33c, and diagonal channel 33b.

There is also a smooth part 34 in which there are no teeth 30g on the outside surface of the cam gear 30. A protrusion 20P for slideably engaging the cam channel 33 is also provided at the front edge of the traverse base 20 (see FIG. 2 and FIG. 3). This protrusion 20P engages the cam channel 33 to support the front of the traverse base 20 by way of cam gear 30 on the drive base 10.

Figure 6:
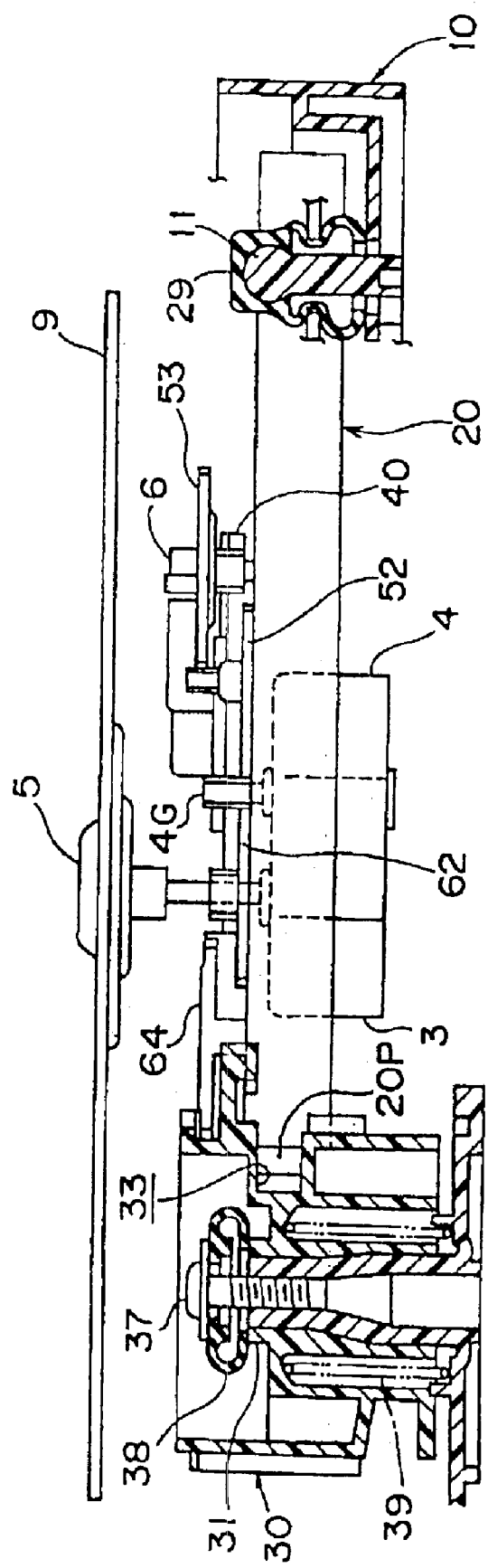
FIG. 6 is a partial side section view showing a typical support structure holding the traverse base to the drive base.
Figure 7:
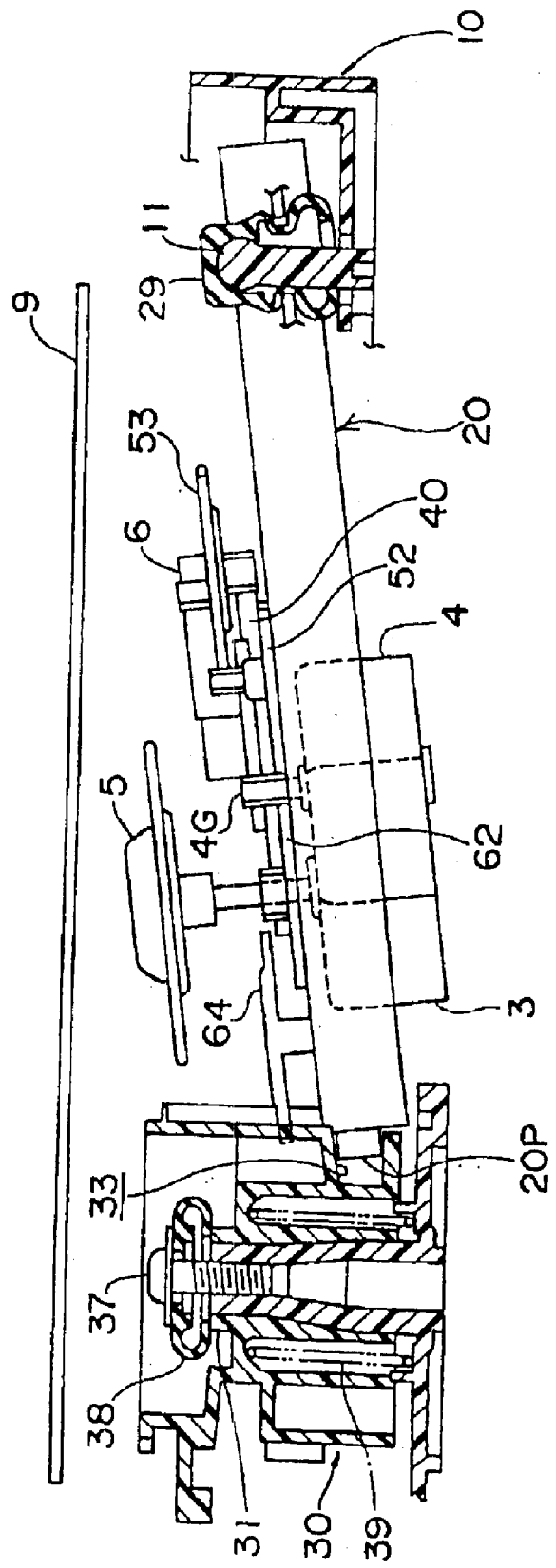
FIG. 7 is a typical partial side section view showing the traverse base inclined to the drive base.

As shown in FIG. 6 and FIG. 7, the traverse base 20 is thus supported at the back by way of bushings 29 and at the front by way of cam gear 30 supported on floating collar 38 and floating spring 39 so that it floats within specific limits on the drive base 10. Note that these limits are determined by the flexibility of the floating bushing 29, floating collar 38, and floating spring 39.

The traverse base 20 is thus not rigidly supported on the drive base 10 in the manner of a disk drive according to the related art, but is supported so that it can float on the drive base 10 within the range of the flexibility of the supporting damping members, that is, the floating bushing 29, floating collar 38, and floating spring 39. The damping members 29, 38, and 39 can therefore absorb an impact, shock, or vibration applied to the disk drive 1, thereby preventing the force of the impact or vibration from being directly transmitted from the drive base 10 to components on the traverse base 20. As a result, a disk drive 1 with improved durability and resistance to impact and vibration can be achieved.

Furthermore, by supporting the traverse base 20 so that it floats on the drive base 10 within the range of the flexibility of the damping members 29, 38, and 39, it is possible to adjust the relative positions of components on the drive base 10 and traverse base 20 within the floating range of the traverse base 20. Compared with a conventional disk drive in which the components are rigidly supported, a disk drive according to the present invention therefore also requires less precision in parts manufacture and assembly, and productivity can therefore be improved in the manufacturing process.

As shown in FIG. 2 and FIG. 3, first and second electric driving motors 3 and 4, and a circuit board 2 comprising a control circuit for controlling driving motors 3 and 4, are also fastened to the bottom of traverse base 20.

A turntable 5 on the top of which is placed a disc 9 (see FIGS. 5 to 7) is also disposed above the traverse base 20. This turntable 5 is linked to the output shaft 3s (see FIG. 3) of the first motor 3 (spindle motor). An optical pickup 6 for writing a data signal to or reading a recorded data signal from the disc 9, and other drive components for operating the disk drive 1, are also disposed on top of traverse base 20.

These drive mechanisms are described next below.

Figure 5:
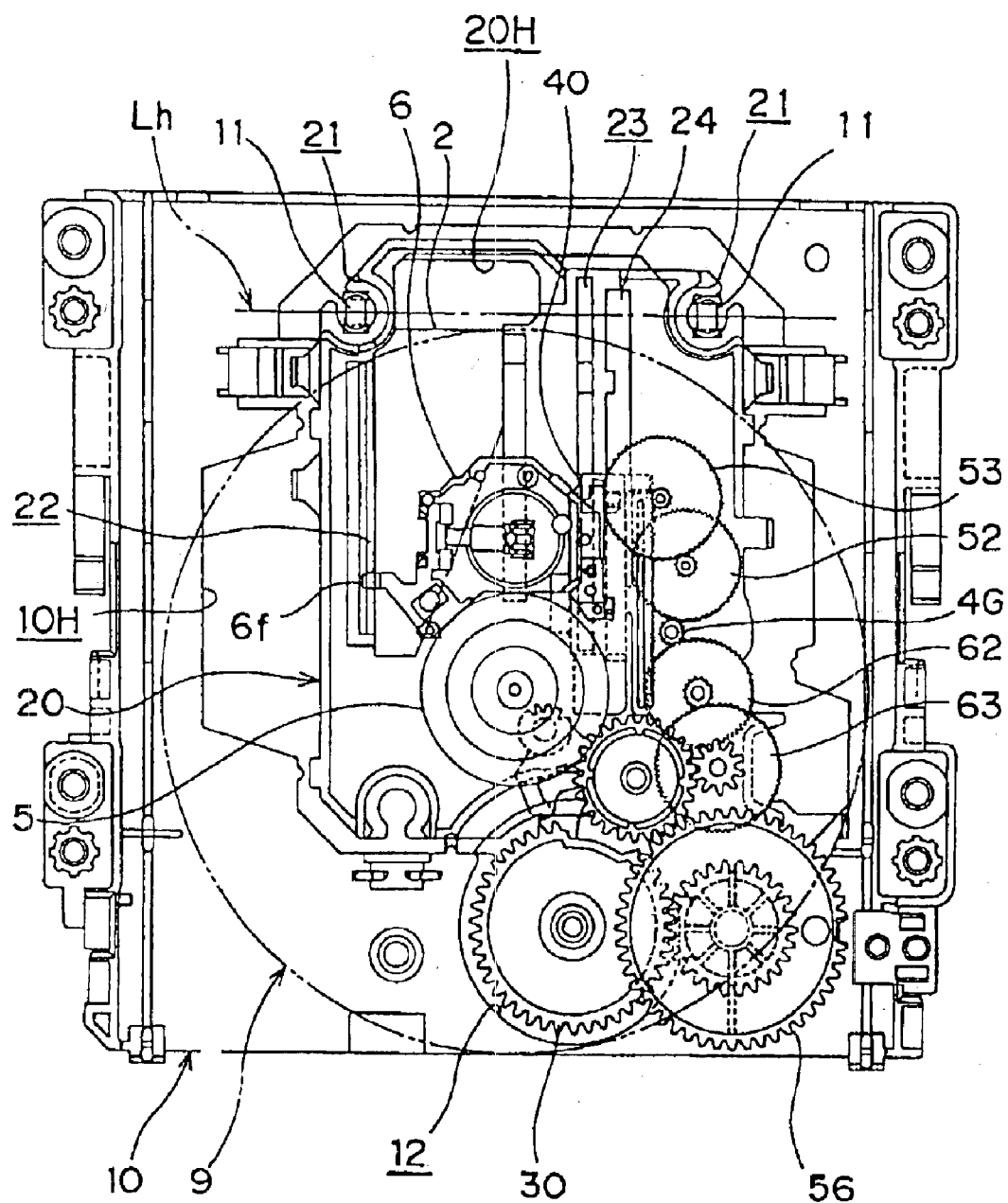
FIG. 5 is a plan view of the traverse base and drive base of the optical disk drive shown in FIG. 1.

As will be understood from FIG. 3 and FIG. 5, a front to back (top to bottom) opening 20H is provided in traverse base 20. A pair of pickup guide channels 22 and 23 for guiding front to back travel of the optical pickup 6 are provided on the sides of this opening 20H. The turntable 5 is preferably positioned near the front end of the pickup guide channels 22 and 23 and opening 20H, or even forward of this position.

The optical pickup 6 is supported so that it can slide front to back on the traverse base 20 by slideably engaging right and left legs 6f in the pickup guide channels 22 and 23. It should be noted that a flexible connection means, such as a flexible ribbon cable, for electrically connecting the optical pickup 6 and circuit board 2 is passed through the opening 20H.

A rail member 24 (guide rail) extending parallel to the guide channel is provided beside one of the pickup guide channels 22 and 23, and a rack member 40 (feed rack) for sliding lengthwise to the guide rail 24 is engaged with the guide rail 24. Note that in FIG. 3 and FIG. 5 the guide rail 24 is provided on the right beside guide channel 23.

One end (the right end in FIG. 3 and FIG. 5) of the optical pickup 6 is linked to the feed rack 40 by a screw 49 (see FIG. 3). As a result, the optical pickup 6 can be moved bidirectionally front and back guided by the pickup guide channels 22 and 23 by sliding the feed rack 40 along the guide rail 24.

As shown in detail in FIGS. 30 to 34, teeth 41 (driven rack part) are formed along substantially the full length on one side of the feed rack 40 (the right side in FIG. 3 and FIG. 5). A section of teeth 42 (transfer path switching rack) is also formed on the other side at the front of the feed rack 40.

It should be noted that arm 40f projecting from the back of the feed rack 40 engages the pickup guide channel 23, and limits movement of the feed rack 40 toward the back by striking and stopping at the back wall of the pickup guide channel 23 when the feed rack 40 travels toward the back (upward in FIG. 5).

A gear set 51 (rack drive gear set) comprising a group of gears is arranged at the traverse base 20 to drive the feed rack 40 and move the optical pickup 6 bidirectionally front and back.

As shown in detail in FIGS. 9 to 13, this gear set 51 comprises: a motor gear 4G fastened to the output shaft 4s of the second motor 4; a first traverse gear 52 having a large diameter input gear 52A (first traverse input gear) for engaging the motor gear 4G, and a small diameter output gear 52B (first traverse output gear) integrally arranged at the top of the input gear 52A; and a second traverse gear 53 having a large diameter input gear 53a (second traverse input gear) for engaging the first traverse output gear 52B, and a small diameter output gear 53B (second traverse output gear) integrally arranged at the bottom of the second traverse input gear 53a. The second traverse output gear 53B engages the driven rack part 41 of the feed rack 40.

When the second motor 4 is driven and the motor gear 4G turns at a specific speed in, for example, the counterclockwise direction as seen in FIG. 9 to FIG. 13 (corresponding to the first direction of rotation in the accompanying claims of this invention), motor rotation is speed reduced at a specific reduction ratio and is transferred to the output side by the gear set 51 so that the final output gear 53B (second traverse output gear) turns counterclockwise at a reduced speed.

This causes the feed rack 40 to travel at a predetermined speed along the guide rail 24 to the front (to the bottom as seen in FIGS. 9 to 13). When the second motor 4 is driven in the direction opposite that described above, and feed rack 40 also travels in the opposite direction.

It is therefore possible by switching the forward and reverse direction of second motor 4 operation to change the direction in which the feed rack 40, and therefore the optical pickup 6, travels, and the feed rack 40 and optical pickup 6 can therefore be driven bidirectionally forward and back.

The feed rack 40 and gear set 51 form the basic optical pickup drive mechanism, equivalent to the optical pickup drive mechanism of the accompanying claims, whereby the optical pickup 6 is moved in two directions between the inside circumference and outside circumference of the disc 9. The pickup guide channels 22 and 23 and guide rail 24 also assist driving the optical pickup 6.

A tray drive gear 56 for moving the tray 55 between an unloading position at the front of the disk drive 1 so that a disc can be place on or removed from the tray 55, and a loading position inside the disk drive 1 at which a disk is loaded to or unloaded from the turntable 5, is provided at the front of the drive base 10.

It should be noted that this loading position and unloading position are equivalent to the first position and second position, respectively, in the accompanying claims.

This tray drive gear 56 comprises a large diameter output gear 56B for engaging the tray rack teeth 55g provided on the back of the tray 55 (see FIG. 19 to FIG. 21), and a small diameter input gear 56A below the output gear 56B. The tray drive gear 56 is positioned beside the cam gear 30 such that the input gear 56A engages the outside teeth 30g of the cam gear 30.

The tray 55, tray rack teeth 55g, and tray drive gear 56 form a disk loading mechanism, equivalent to the disk loading mechanism in the accompanying claims, for carrying a disc 9 between the turntable 5 loading position (first position) and the unloading position (second position) outside the disk drive 1.

A loading drive gear set 61 (see FIG. 9 to FIG. 13) for moving the tray 55 between the disc 9 unloading position and loading position is provided on top of the traverse base 20.

This loading drive gear set 61 comprises: motor gear 4G attached to the output shaft 4s of the second motor 4; a first loading gear 62 having a large diameter first loading input gear 62A for engaging the motor gear 4G, and a small diameter first loading output gear 62B disposed integrally to the top of the first loading input gear 62A; a second loading gear 63 having a large diameter second loading input gear 63A for engaging the first loading output gear 62B, and a small diameter second loading output gear 63B disposed integrally to the top of the second loading input gear 63A; and a large diameter third loading gear 64 for engaging the second loading output gear 63B. This third loading gear 64 engages teeth 30g of the cam gear 30.

Figure 29:
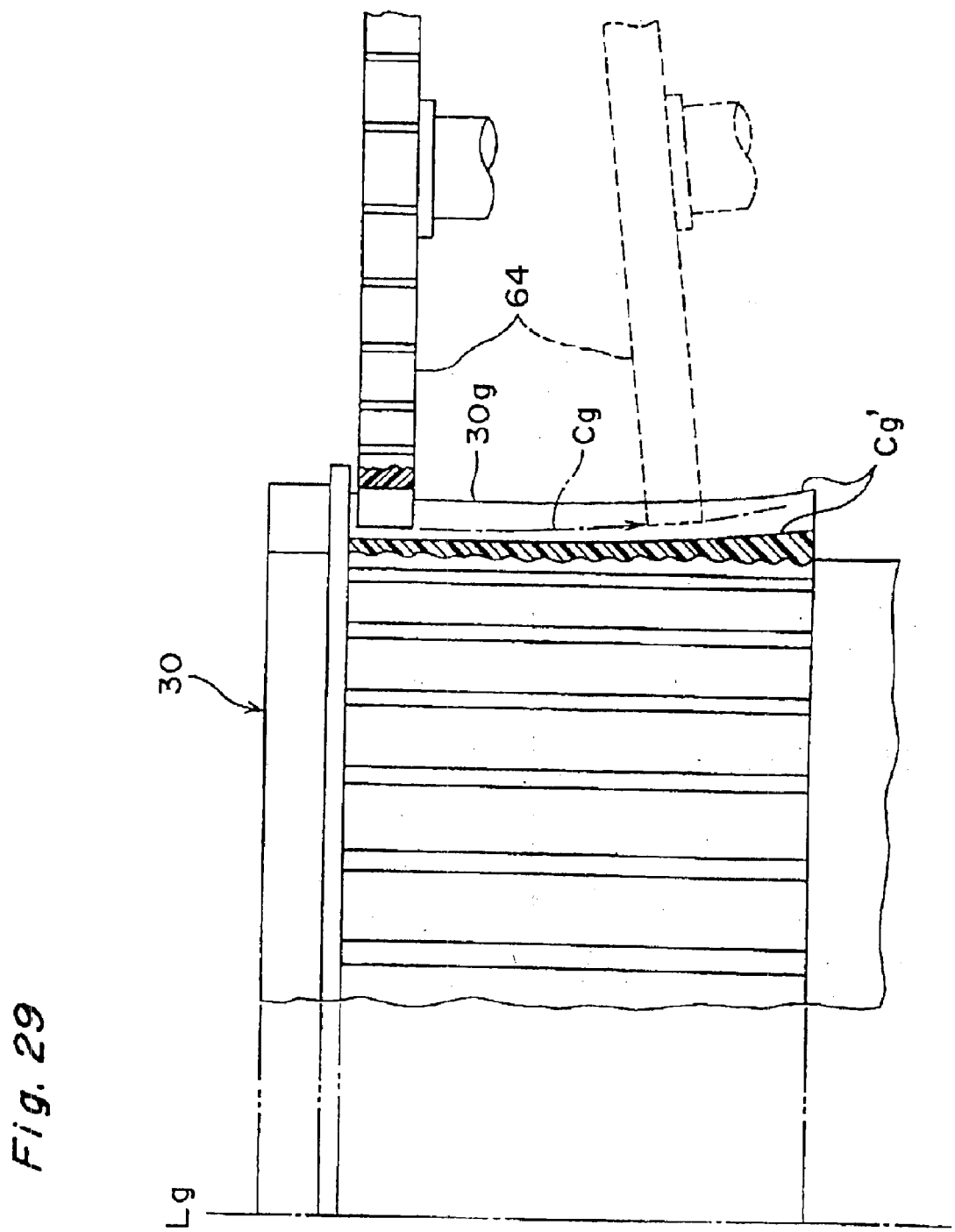
FIG. 29 is a partial vertical section view showing the tooth profile of the cam gear.

The profile of teeth 30g of the cam gear 30 when seen in vertical section, or more preferably in side view as shown in FIG. 29, is curved. When the traverse base 20 and cam gear 30 are assembled into the drive base 10 with the traverse base 20 pivoting at the back edge thereof so as to move circularly up and down relative to the drive base 10 (see FIG. 6 and FIG. 7), the curve of the tooth profile is part of the arc Cg' tracing the circular path Cg of the front edge of the third loading gear 64.

The third loading gear 64 on the traverse base 20 and teeth 30g of the cam gear 30 can therefore reliably and smoothly engage even when the traverse base 20 has swung to a position at an angle to the drive base 10 (indicated by the dotted line in FIG. 29 and shown in FIG. 7). It should be noted that the profile of teeth 30g in vertical section can be a straight line at an incline to the longitudinal axis Lg of the cam gear 30 and approaching curve Cg'.

It should be further noted that the second loading gear 63 is not shown in FIG. 6 and FIG. 7 to provide a clearer view of the third loading gear 64 engaging teeth 30g of cam gear 30.

As thus described, the profile in vertical section of the teeth 30g of cam gear 30 is an arc following the circular path of the third loading gear 64, that is, the last output gear of the loading drive gear set 61, as the gear 64 moves circularly up or down in conjunction with the circular movement of the traverse base 20, or is a straight line approaching this arc. As a result, the final output gear 64 reliably and smoothly engages teeth 30g of cam gear 30 even when the loading drive gear set 61 moves in a circular path vertically in conjunction with the movement of traverse base 20 in a circular path.

It should be noted that a loading drive mechanism for driving the disk loading mechanism comprises basically the loading drive gear set 61 and cam gear 30, or more specifically the teeth 30g thereof, and this loading drive mechanism corresponds to the loading drive mechanism of the accompanying claims.

The above-noted optical pickup 6 can move to a specified position on the inside circumference side of the data signal recording area of the disc 9. When the optical pickup 6 is then moved by the drive power of second motor 4 via the gear set 51 from the outside circumference side of the disc 9 to the inside circumference side, and reaches said specified position outside of the data signal recording area of the disc 9, the transfer path of second motor 4 drive power is switched to the loading drive gear set 61.

This transfer path switching operation is described further in detail with reference to FIG. 14 to FIG. 18. A vertical stud 20s is disposed at the front of the traverse base 20. A trigger lever 71 for switching the power transfer path is held on the stud 20s. A rocking lever 73 restricting the position of the trigger lever 71 is provided nearby.

Figure 37:
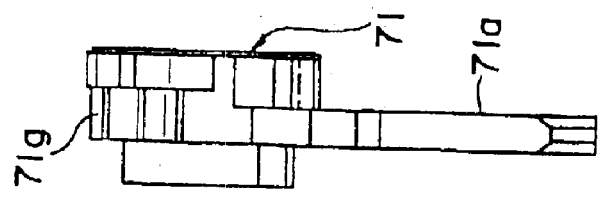
FIG. 37 is a vertical section view of the trigger lever through line Y37—Y37 in FIG. 36.
Figure 36:
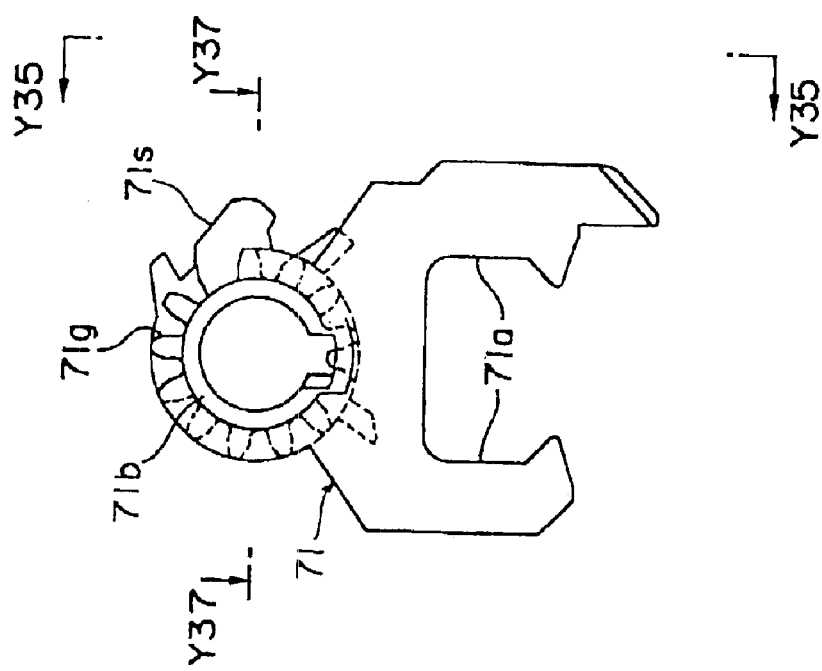
FIG. 36 is a plan view of the trigger lever of the drive mechanism.
Figure 35:
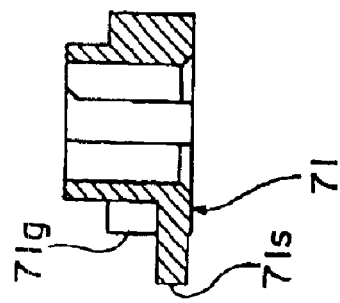
FIG. 35 is a section view of the trigger lever through line Y35—Y35 in FIG. 36.

As shown in detail in FIG. 35 to FIG. 37, the trigger lever 71 comprises a base 71b fit rotatably on the stud 20s, a partial gear 71g formed on the outside of the base 71b, and a pair of engaging arms 71a for engaging the cam gear 30. A stop 71s for engaging claw 73d of rocking lever 73 is provided on the outside of the trigger lever base 71b.

The partial gear 71g is for engaging the power transfer path switching rack 42. The engaging arm 71a is also arranged so that it can engage the hook 32 protruding from the outside of the cam gear 30.

Figure 38:
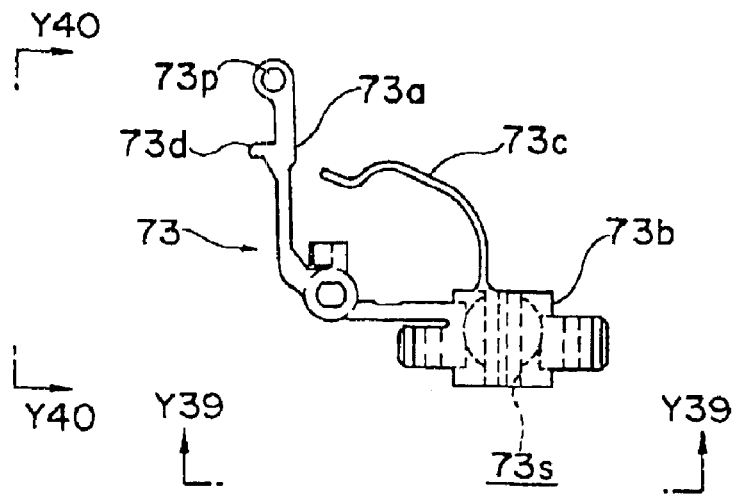
FIG. 38 is a plan view of a rocker lever of the drive mechanism.
Figure 39:
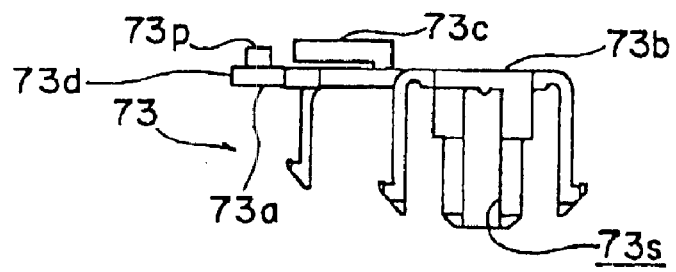
FIG. 39 is a side view of the rocker lever through line Y39—Y39 in FIG. 38.
Figure 40:
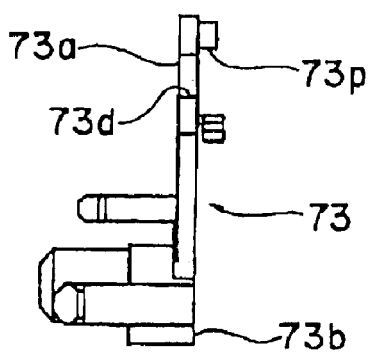
FIG. 40 is a side view of the rocker lever through line Y40—Y40 in FIG. 38.

As shown in detail in FIG. 38 to FIG. 40, the rocking lever 73 comprises a base 73b that is fit and fastened at the front of traverse base 20, a lever part 73a extending in a basic L shape from the base 73b, and a spring part 73c extending basically in an arc from the base 73b. A claw 73d for engaging the stop 71s of trigger lever 71, and a pin 73p protruding upward, are integrally molded to the lever part 73a. A guide slot 73s through which the regulating rod 75s of positioning rod 75 slides freely is also formed in the base 73b.

Figure 30:
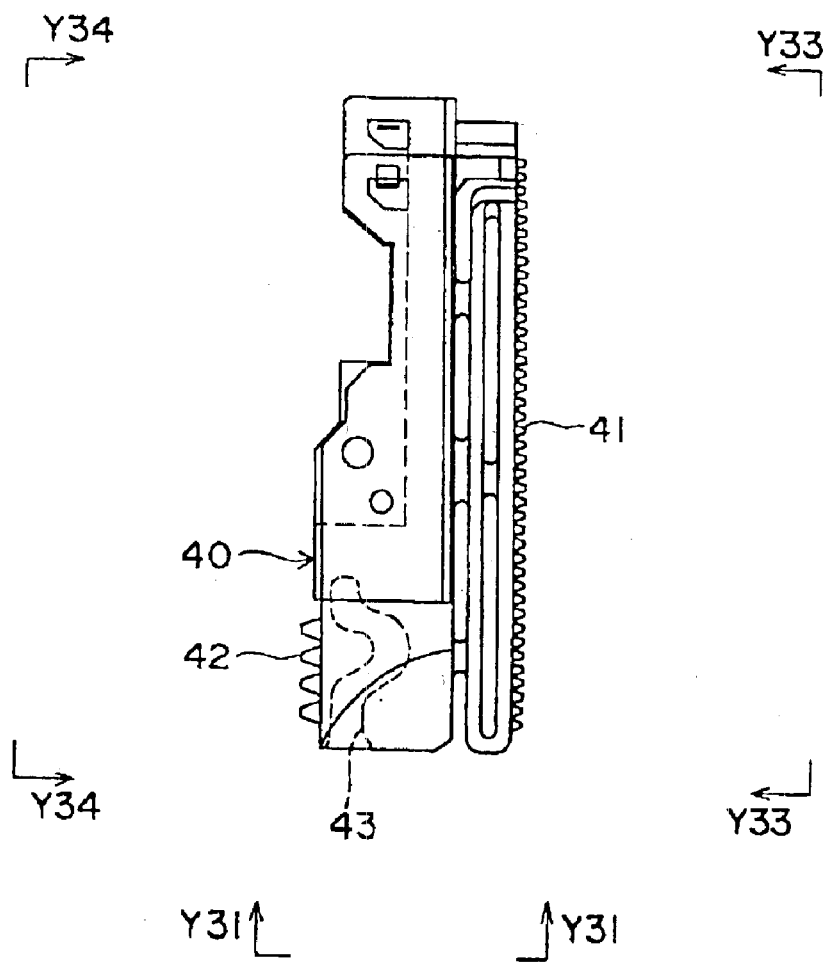
FIG. 30 is a plan view of the feed rack of the drive mechanism.
Figure 31:
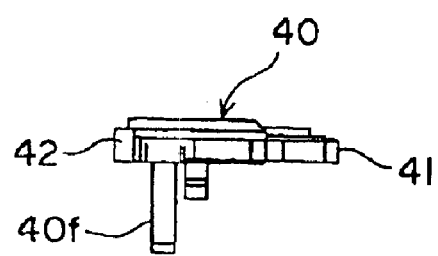
FIG. 31 is a side section view of the feed rack through line Y31—Y31 in FIG. 30.
Figure 34:
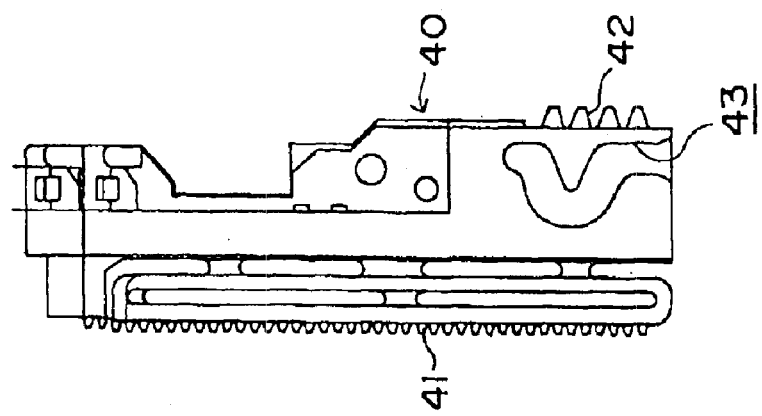
FIG. 34 is a section view of the feed rack through line Y34—Y34 in FIG. 30.
Figure 33:
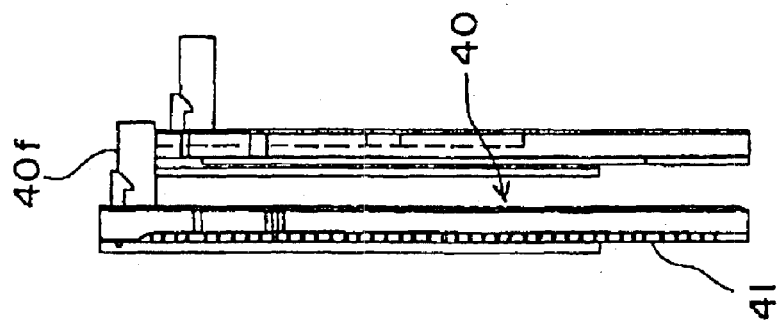
FIG. 33 is a section view of the feed rack through line Y33—Y33 in FIG. 30.
Figure 32:
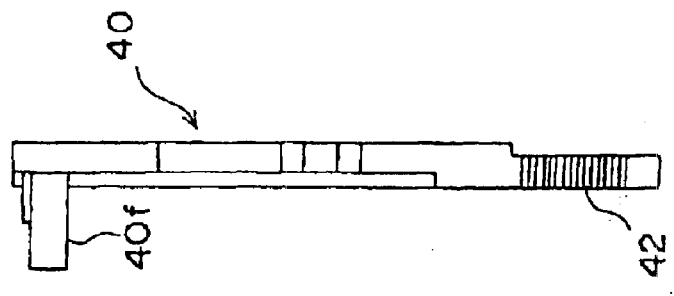
FIG. 32 is a back view of the feed rack.

As will be known from FIG. 30 and FIG. 32, a cam channel 43 with a curved shape when seen in plan view is provided in the feed rack 40. The front end of the cam channel 43 is open to the front of the feed rack 40. The pin 73p of rocking lever 73 is thus able to engage and slide freely through this cam channel 43.

A positioning mechanism for precisely maintaining engagement of the various components arranged at the drive base 10 and traverse base 20 is also provided on the drive base 10 and traverse base 20.

More specifically, a positioning member 75 (positioning rod) for positioning the traverse base 20 side to side in the drive base 10 is disposed at the front of the traverse base 20. As shown in detail in FIG. 41 to FIG. 43, this positioning rod 75 comprises an engaging base 75b for engaging and sliding freely front-back in the front-back guide channel 26 formed in the top of traverse base 20, extension 75c projecting forward from the engaging base 75b, and regulating rod 75s extending front-back (top-bottom as seen in FIG. 14 to FIG. 18) at a position offset to the right from the engaging base 75b and extension 75c.

As noted above, this regulating rod 75s is inserted through and slides freely front-back in the guide slot 73s formed in the base 73b of rocking lever 73. As described more fully below, after assembly the front of the extension 75c contacts spring part 73c of rocking lever 73, and is pushed thereby to the back. The back of the extension 75c can also contact the front of the feed rack 40 so that as the feed rack 40 moves to the front, the entire positioning rod 75 also moves to the front.

As shown in FIG. 14 to FIG. 18, a positioning channel 13 into which the regulating rod 75s of the positioning rod 75 can enter and fit is provided in the front end wall of the internal space 10H of drive base 10. When the feed rack 40 moves further than a specific distance to the front, the front of the feed rack 40 contacts and pushes on the back of the extension 75c of positioning rod 75, causing the entire positioning rod 75 to advance with the engaging base 75b following the guide channel 26. This causes the regulating rod 75s to fit into the positioning channel 13 of the drive base 10, and thus accurately positions the traverse base 20 side to side to the drive base 10.

A cam channel 27 shaped like an arc when seen in plan view is also provided in the top at the front of the traverse base 20. An engaging protrusion 32p is also provided on the back of the hook 32 on cam gear 30. This engaging protrusion 32p engages the cam channel 27, and thus regulates the front-back position of the traverse base 20 relative to the drive base 10.

The vertical positioning between the front of the traverse base 20 and the drive base 10 is also accurately controlled by the protrusion 20P provided at the front of traverse base 20 engaging the cam channel 33 of cam gear 30.

The position of the front of traverse base 20 to the drive base 10 is thus accurately determined in three perpendicular directions, that is, side to side, front to back, and vertically, and the components mounted on the drive base 10 and traverse base 20 can be accurately and reliably engaged with their corresponding parts. It is therefore possible when switching the transfer path of second motor 4 drive power to accurately maintain a linkage between the disk loading mechanism on the drive base 10 and the loading drive mechanism on the traverse base 20.

The disk drive 1 also has a clamping plate 95 with an assembled damper 96 for clamping a disc 9 to the turntable 5 (see FIGS. 1, 2, 4, 22, and 23). The damper 96 has a magnet 97 in the center thereof, and felt 98 affixed to the disk contact surface on the bottom of the damper 96.

A claw 95d is formed at each of the plurality of mounting arms 95f (two are provided at front and back in this exemplary embodiment) disposed to right and left sides of the clamping plate 95. The clamping plate 95 is connected to the drive base 10 by engaging these claws 95d with the sides of the drive base 10. By thus assembling the clamping plate 95 to the drive base 10, the center of the damper 96 can be centered with the center of turntable 5 rotation.

The clamping plate 95 comprises right and left horizontal bases 95b for supporting mounting arms 95f on the same right and left sides, an annular center holder 95a for supporting the damper 96, and a horizontal connector 95c for connecting the holder 95a to the bases 95b.

A notch 95e is formed on each side between the center holder 95a and the corresponding horizontal bases 95b. The width of each horizontal connector 95c is less than the width of the horizontal base 95b by an amount corresponding to the notch 95e. This gives the horizontal connectors 95c less rigidity than the horizontal bases 95b, and makes it easier for the horizontal connectors 95c to bend vertically.

When the disk drive 1 is dropped, for example, exposing the disk drive 1 to a large shock such that the turntable 5 contacts the clamping plate 95, the clamping plate 95 is able to easily flex in the vertical direction, thus absorbing the force of impact, and therefore effectively prevent the turntable 5 (and spindle motor 3 linked to the turntable 5) from suffering major damage.

The operation of a disk drive 1 thus comprised is described next below.

When a disc 9 is loaded into the disk drive 1 and a signal recorded on the disc 9 is being reproduced by the optical pickup 6 (see FIG. 9), the traverse base 20 is supported substantially parallel to the drive base 10 as shown in FIG. 6 because the protrusion 20P at the front edge of the traverse base 20 fits into the top horizontal channel 33a of the cam channel 33 in cam gear 30.

Figure 14:
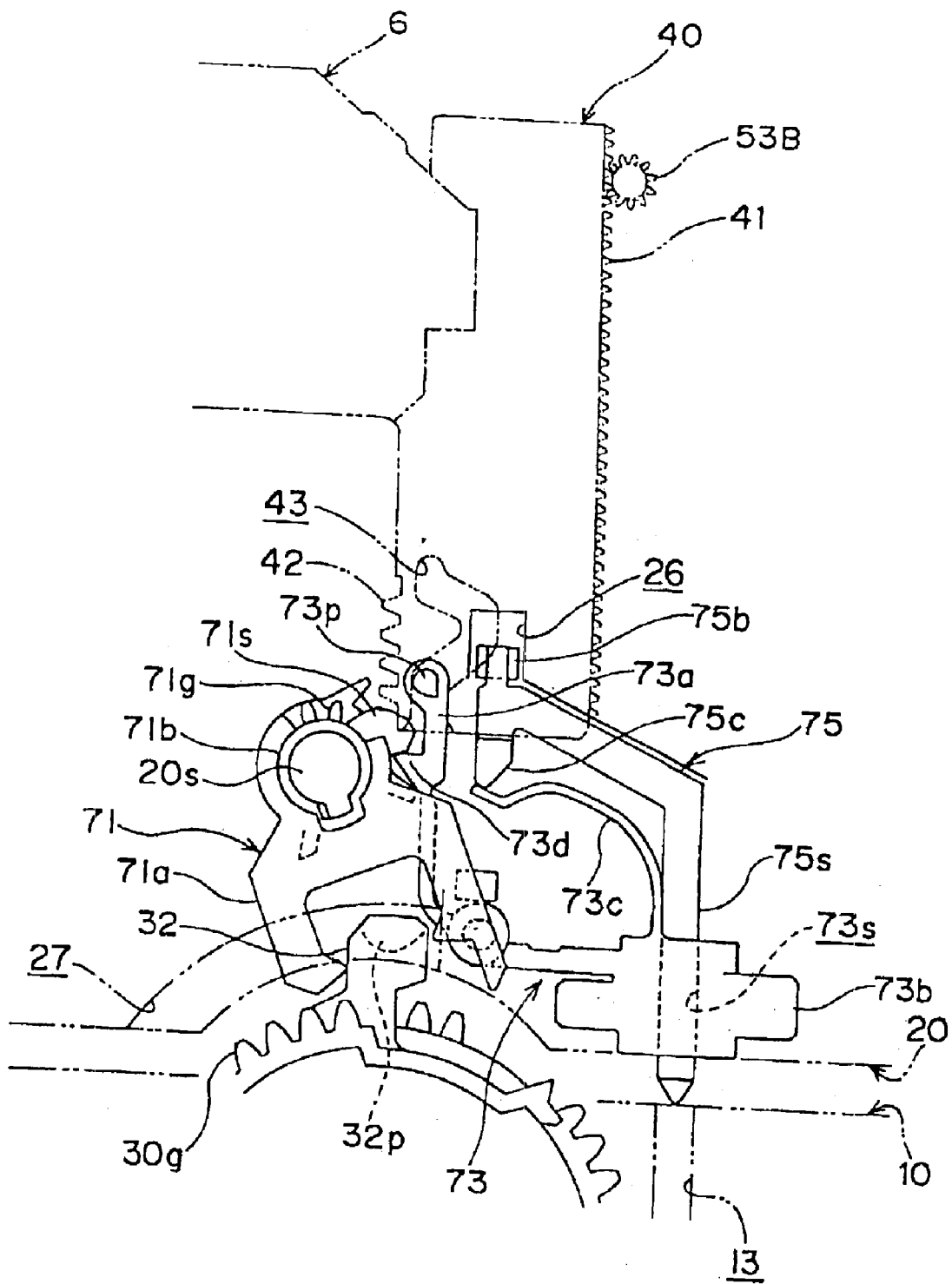
FIG. 14 to FIG. 18 are a sequence of enlarged plan views showing the drive power transfer path switching operation of the drive mechanism in the optical disk drive shown in FIG. 1.

The stop 71s of the trigger lever 71 is engaged with the claw 73d of rocking lever 73, and the engaging arm 71a engages the hook 32 of cam gear 30 at this time as shown in FIG. 14. When thus engaged, the trigger lever 71 is turned all the way clockwise in FIG. 9 and FIG. 14.

To read a signal from the disc 9 in this position, the spindle motor 3 is driven to spin the turntable 5 on which the disc 9 is loaded at a specific speed, the optical pickup 6 is moved to a position below the signal track to be reproduced, and the optical elements (that is, the optical system including a laser and lens) of the optical pickup 6 are operated to read the desired signal from the disc 9.

If the signal track to be reproduced is not above the current optical pickup 6 position, or if signals are to be read from some plurality of signal tracks, the optical pickup 6 must be moved appropriately toward the inside circumference of the disc 9, that is, toward the front of the disk drive 1, or the outside circumference of the disc 9, that is, toward the back of the disk drive 1.

The optical pickup 6 is moved by means of the optical pickup drive mechanism. As described above, the second motor 4 is therefore driven and the motor gear 4G turns. Rotation of the motor gear 4G is speed reduced at a specific speed reducing ratio and transferred to the output side by the rack drive gear set 51, thereby causing the final output gear 53B (second traverse output gear) to turn at a reduced speed and moving the feed rack 40 and the optical pickup 6 linked thereto front or back. If the motor gear 4G turns counterclockwise in FIG. 9 to FIG. 13, the optical pickup 6 moves forward (downward in FIG. 9 to FIG. 13) toward the inside circumference of the disc 9. If the motor gear 4G turns in the opposite direction, the optical pickup 6 moves to the back (upward in FIG. 9 to FIG. 13) toward the outside circumference of the disc 9.

It should be noted that the loading drive gear set 61 also turns in conjunction with second motor 4 operation during this signal reproduction mode, but the teeth of the third loading gear 64, that is, the final output gear of the gear set 61, are positioned at the smooth part 34 of the cam gear 30 and thus do not engage the cam gear teeth 30g. Drive power from the second motor 4 is therefore not transferred to the cam gear 30, and hence to the tray drive gear 56, in this signal reproduction mode.

Figure 10:
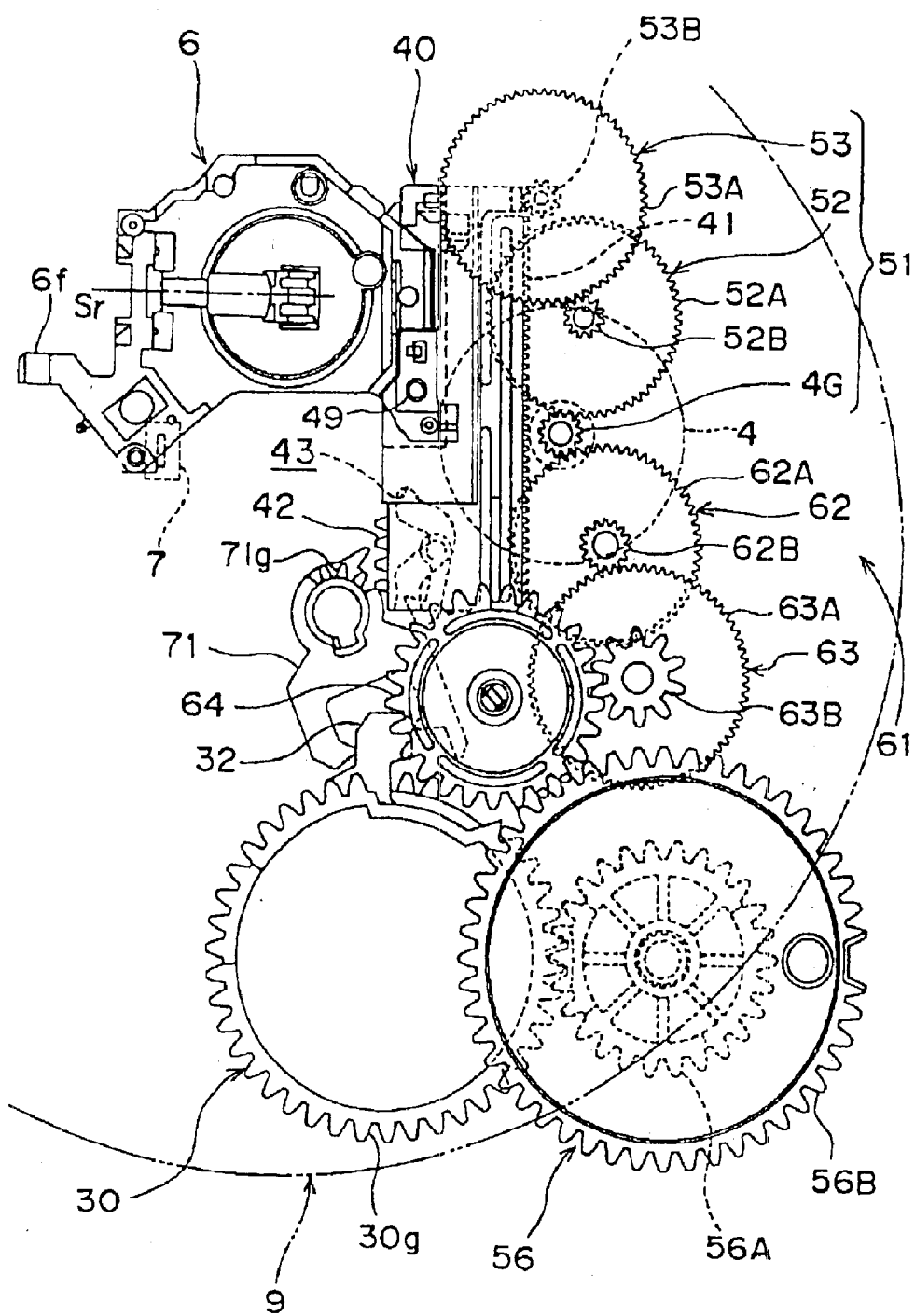
Figure 15:
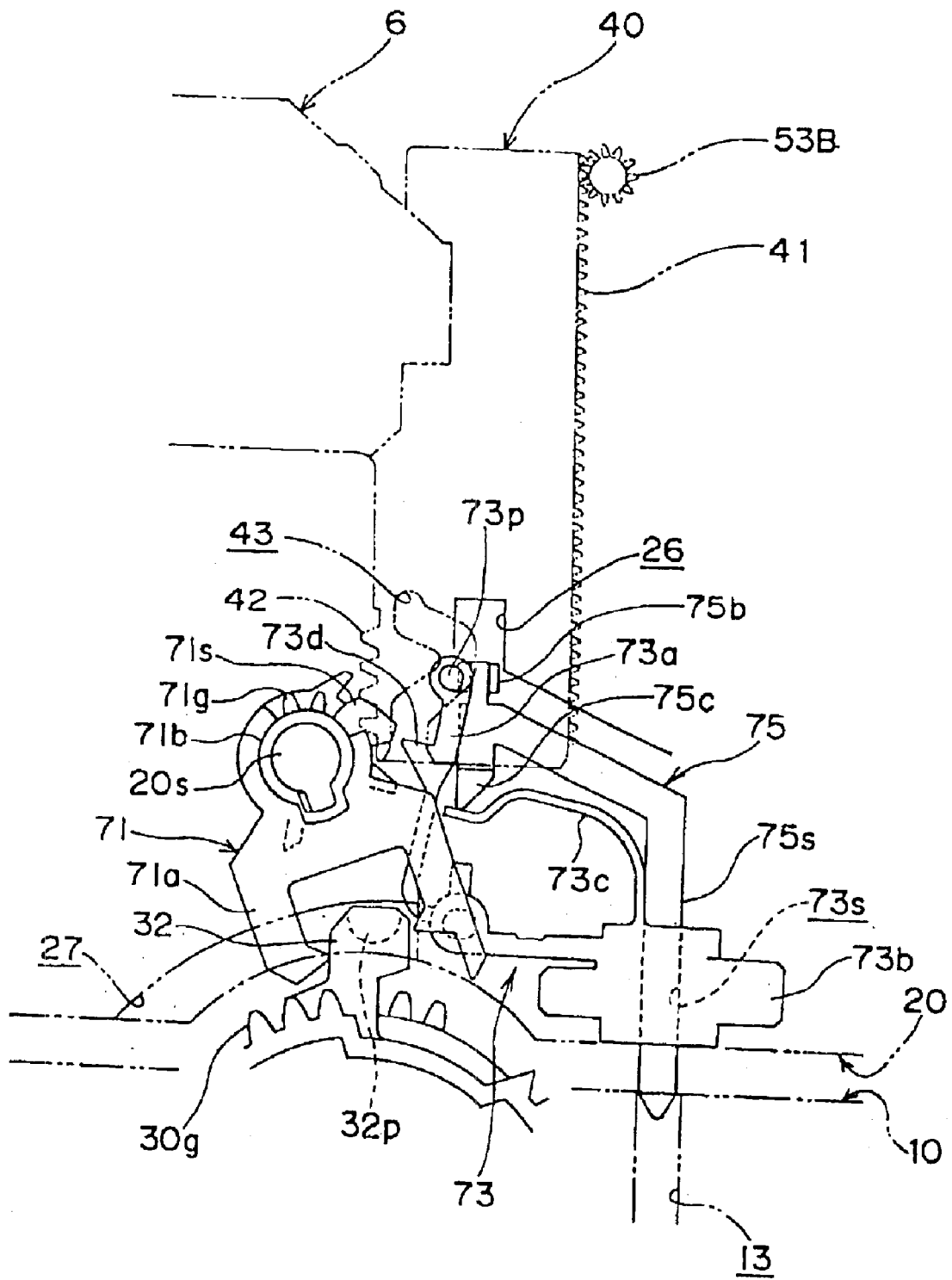

FIG. 10 and FIG. 15 show the drive train when positioned for reading a signal recorded to the most inside circumference part of the recording position range (data signal recording area) of the disc 9. When positioned to read from this disc area, the optical pickup 6 is moved forward by the optical pickup drive mechanism to the inside circumference edge Sr of the data signal recording area of the disc 9, and the back end of the driven rack part 41 of the feed rack 40 is engaged with the final output gear 53B (second traverse output gear) of the rack drive gear set 51. The power transfer path switching rack 42 is also extremely close to the partial gear 71g of trigger lever 71.

The data signal recording area of an optical disc 9 is known from the literature to be determined by the distance from the disc center based on the disk format standard. A conventional disk drive also has an optical pickup position detector disposed at a position corresponding to the most inside circumference position of the data signal recording area to detect whether the optical pickup is at this most inside circumference position or has moved thereto so that the optical pickup can be prevented from moving beyond this point further towards the inside circumference of the disc.

In contrast to this conventional design, a disk drive 1 according to this preferred embodiment has an inside circumference detection switch 7 disposed at the inside circumference edge Sr of the data signal recording area of the disc 9, and uses the inside circumference edge Sr as an inside circumference edge switching position. When off, this inside circumference detection switch 7 operates the same as in a conventional optical disk drive to detect whether the optical pickup is at this most inside circumference position or has moved thereto. What differs from the conventional disk drive is that when the inside circumference detection switch 7 is on, movement of the optical pickup 6 beyond the inside circumference edge Sr is not limited when the optical pickup 6 trips the inside circumference detection switch 7, and the optical pickup 6 can therefore be purposely moved further to the inside circumference of the disc 9.

The inside circumference detection switch 7 operates mechanically in the same manner as a common conventional detector, and is arranged to project and retract vertically at the top of the traverse base 20. When the optical pickup 6 reaches a position above the inside circumference detection switch 7, the bottom of the optical pickup 6 interferes with the switch 7, causing the inside circumference detection switch 7 to be pushed into the traverse base 20 in resistance to the pressure of a switch spring (not shown in the figure). It should be noted that this inside circumference detection switch 7 shall not be limited to a mechanical device such as described above, and can alternatively be a non-contact detector or any of various other known designs.

Figure 11:
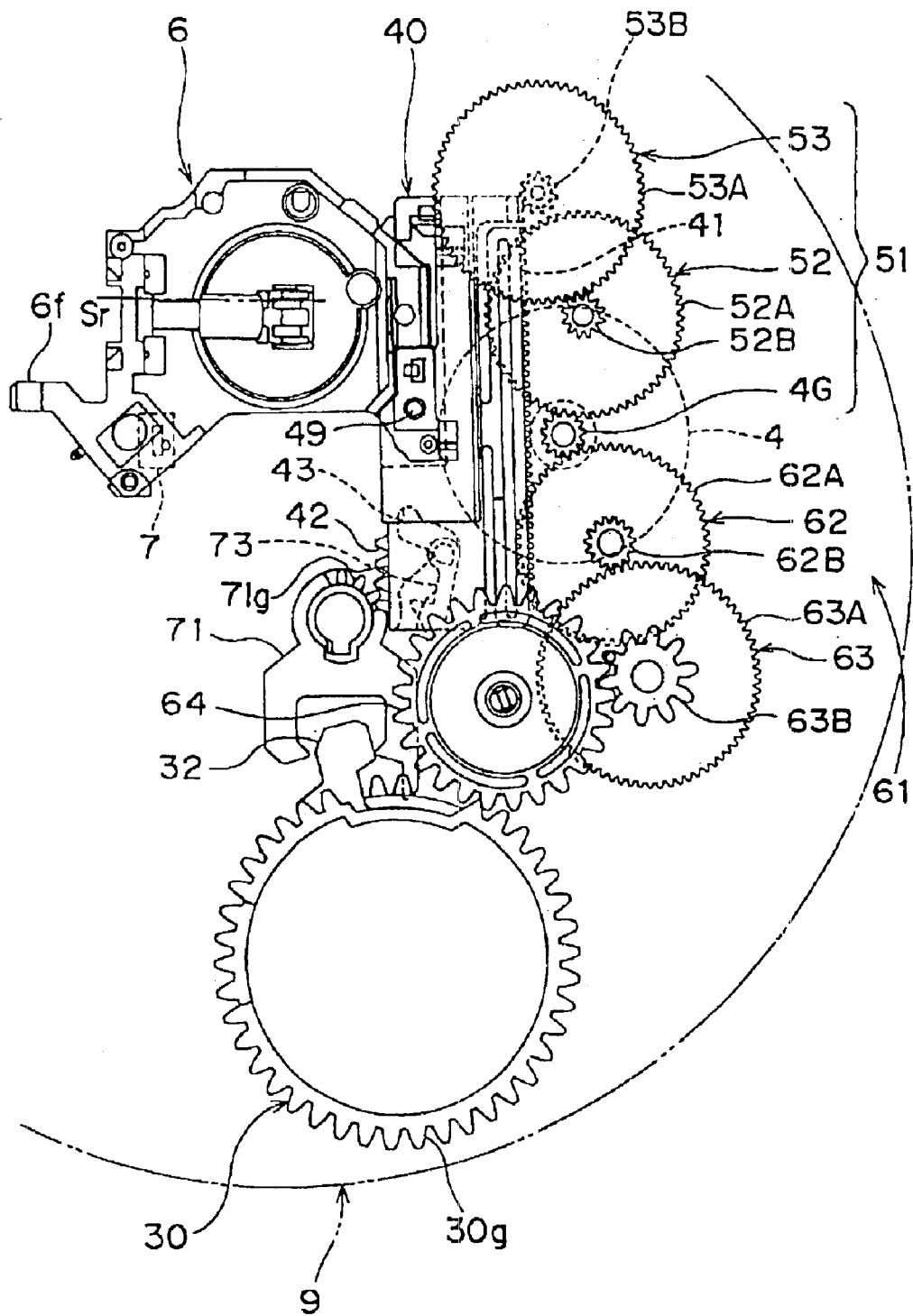
Figure 16:
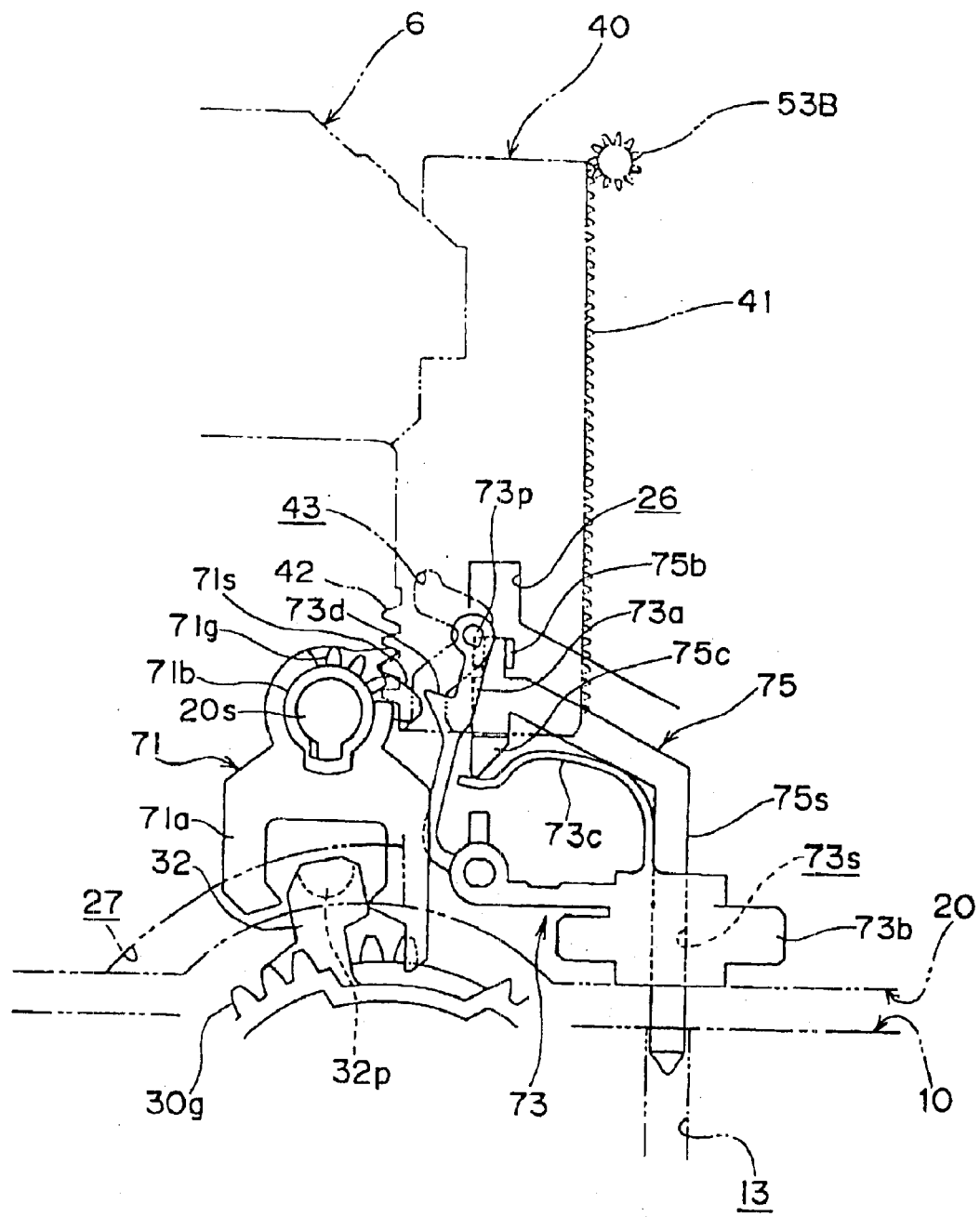

FIG. 11 and FIG. 16 show the optical pickup 6 after it has moved to the inside circumference edge Sr, operated the inside circumference detection switch 7, and then moved beyond this position farther to the inside circumference of the disc 9.

The differences between the state shown in FIGS. 10 and 15 and the state shown in FIGS. 11 and 16, as well as the movement to these states, are described below.

The optical pickup 6 is moved from the state shown in FIGS. 10 and 15 to the state shown in FIGS. 11 and 16 by continuing to drive the second motor 4 in the same direction (counterclockwise in this case) from the state shown in FIGS. 10 and 15 after the optical pickup 6 operates the on-state inside circumference detection switch 7.

By thus moving the optical pickup 6 further to the inside circumference, the power transfer path switching rack 42 of the feed rack 40 moving the optical pickup 6 front-back engages the partial gear 71g of trigger lever 71, and turns the trigger lever 71 clockwise. In conjunction with this the engaging arm 71a of trigger lever 71 turns the hook 32 of cam gear 30 counterclockwise.

The cam gear 30 thus turns counterclockwise, and the cam gear teeth 30g begin to engage the final output gear 64 (third loading gear) of the loading drive gear set 61. The driven rack part (teeth section) 41 of the feed rack 40 is still engaged with the final output gear 53B (second traverse output gear) of the rack drive gear set 51 at this time.

The rocking lever 73 engaged with the stop 71s of the trigger lever 71 to position and hold the trigger lever 71 also turns as a result of the rocking lever pin 73p following the cam channel 43 of feed rack 40. As a result, the claw 73d releases the trigger lever 71.

Figure 12:
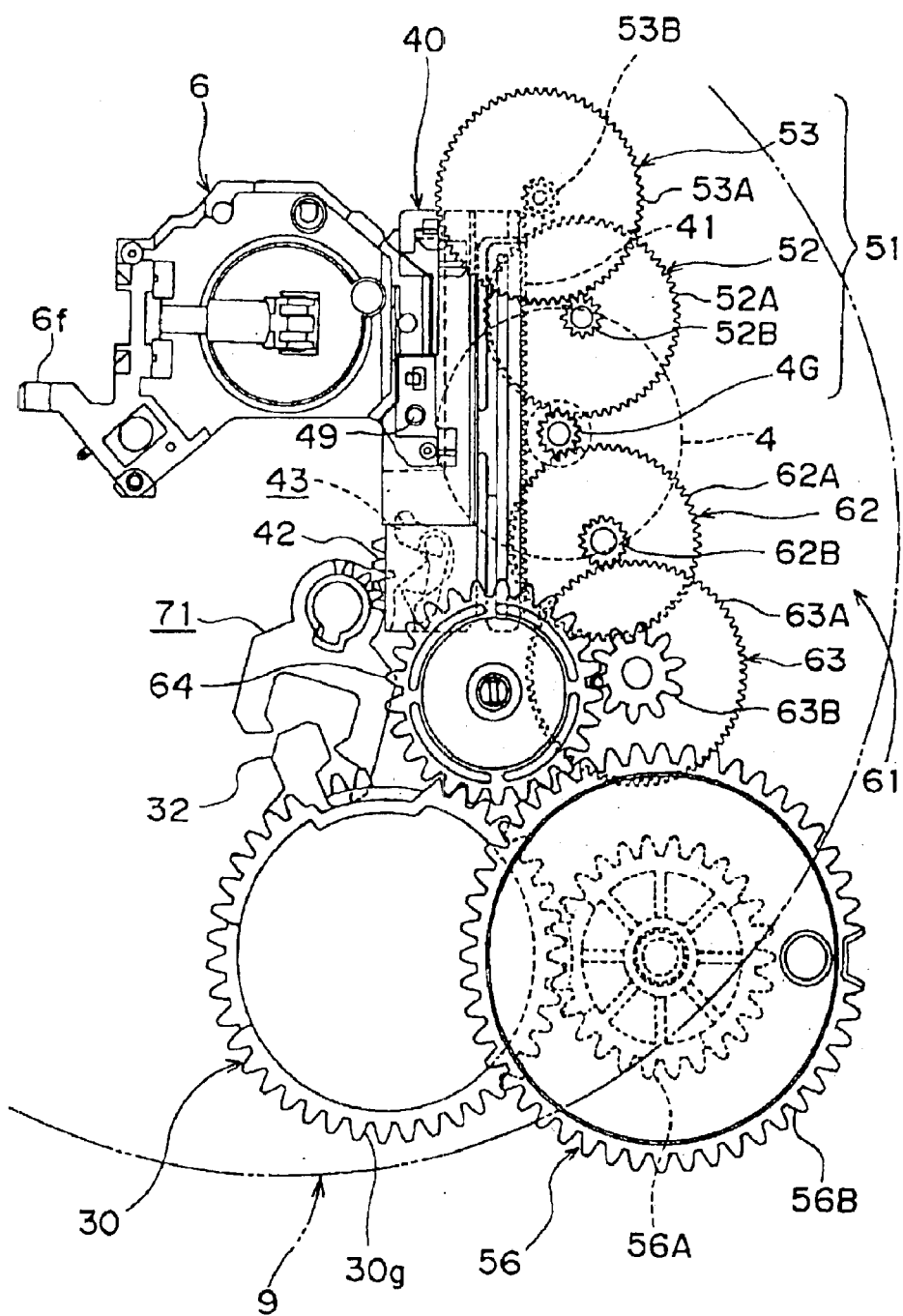
Figure 17:
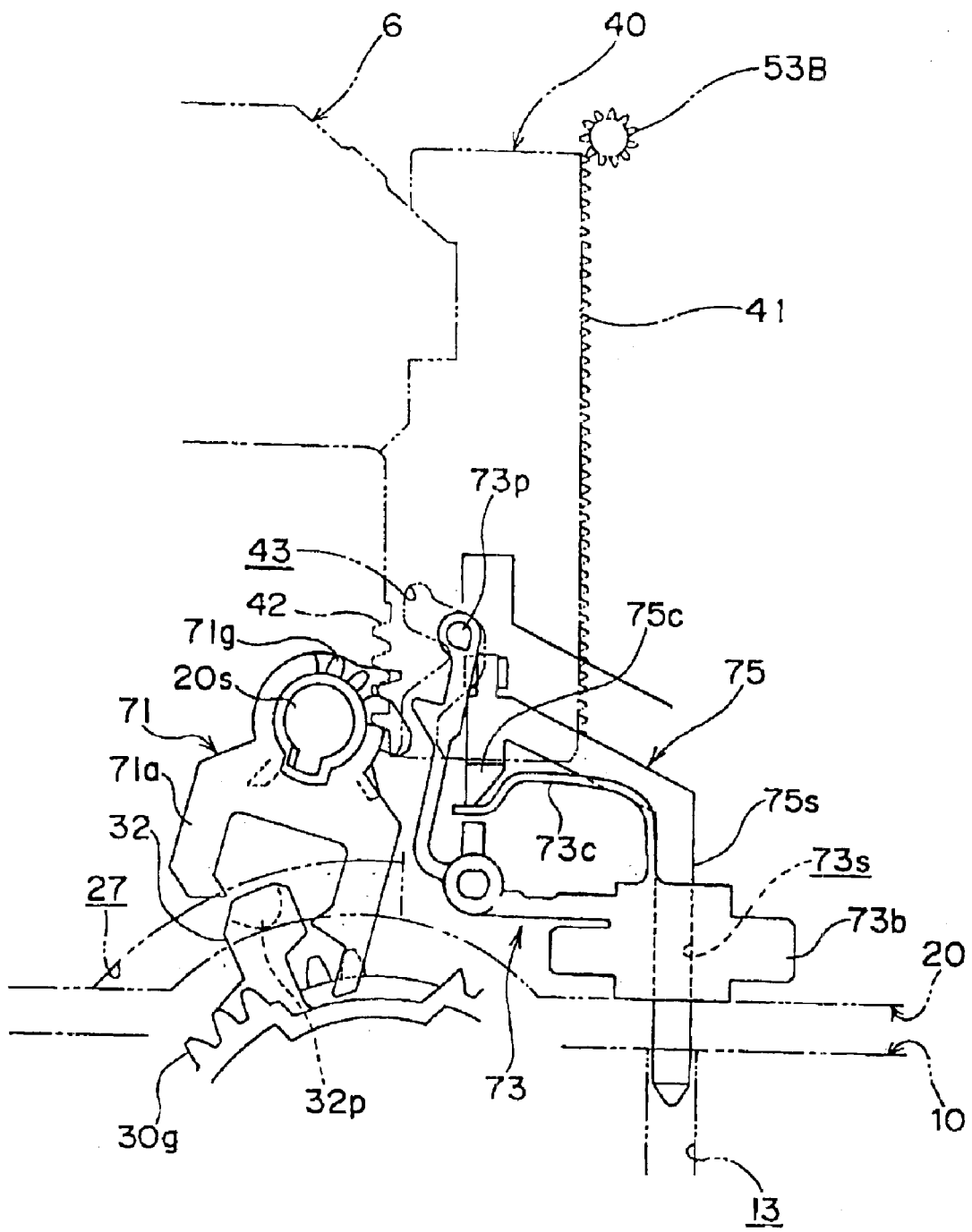

FIG. 12 and FIG. 17 show the state in which the cam gear 30 is turned counterclockwise by drive power from the third loading gear 64 from where the cam gear 30 begins to engage the final output gear 64 (third loading gear) of the loading drive gear set 61.

This operation is also accomplished by the motor gear 4G of second motor 4 turning counterclockwise, that is, in the same direction in which the motor gear 4G turns to move the optical pickup 6 to the inside circumference.

This operation of the cam gear 30 turns the trigger lever 71 clockwise to a position limited by the cam gear 30, thus drawing the optical pickup 6 to a further inside circumference position (forward position) until the driven rack part 41 of the feed rack 40 disengages the second traverse output gear 53B. As a result, further counterclockwise rotation of the motor gear 4G, and hence drive power from the second motor 4, is not transferred to the feed rack 40, that is, does not move optical pickup 6.

The pin 73p of rocking lever 73 is guided along the cam channel 43 of feed rack 40 to enter the inclined part of the cam channel 43 at this time, and is thus turned counterclockwise by the spring tension of the rocking lever 73. The trigger lever 71 continues to be turned clockwise until it completely separates from the cam gear 30.

It should be noted that basically the trigger lever 71, rocking lever 73, and cam gear 30 (or more specifically the hook 32 and smooth part 34 of the cam gear 30), as well as more specifically the power transfer path switching rack 42 and cam channel 43 of the feed rack 40, combine to form a power transfer path switching mechanism for switching the transfer path of second motor 4 drive power. This power transfer path switching mechanism corresponds to the power transfer path switching mechanism of the accompanying claims.

As described above, the feed rack 40 can move the optical pickup 6 to an inside circumference edge Sr position at the inside circumference limit of the data signal recording area of the disc 9, and can then continue moving the optical pickup 6 beyond this position closer to the inside circumference of the disc 9. Furthermore, the second motor 4 drive power transfer path is switched by the feed rack 40 moving to this specific position at the inside circumference or moving from this specific position toward the outside circumference of the disc. As a result, drive power from a single motor (the second motor 4) can be used to power the signal reading operation of the optical pickup 6, as well as switching the drive power transfer path of the second motor 4.

Furthermore, by continuing to drive the same motor 4 without changing the direction of shaft rotation after moving the optical pickup 6 for signal reproduction to the inside circumference edge Sr of the data signal recording area of the disc 9, the disc 9 is automatically unclamped from the turntable 5 so that the disc 9 can be ejected from the disk drive. It is therefore possible to eliminate the dedicated disk loading motor required for disk loading and unloading in a conventional optical disk drive. It is therefore possible to provide a less expensive disk drive by thus reducing the number of motors used in the disk drive.

Furthermore, by changing the direction of second motor 4 operation or simply stopping the second motor 4 after the optical pickup 6 has been moved to the inside circumference edge Sr of the data signal recording area of the disc 9 and the position of the optical pickup 6 has been detected by the inside circumference detection switch 7, it is possible to not eject the disc 9 from the disk drive and continue reading or writing signals to the same disc 9.

The number of detectors or detection switches used in the disk drive can also be reduced, and a lower cost optical disk drive can therefore be provided, because the inside circumference detection switch 7 can be used to detect if a disk has been loaded into the disk drive and if the disk has been clamped, and dedicated detectors used in a conventional disk drive for these detection purposes can therefore be eliminated.

The traverse base 20 in a disk drive according to this preferred embodiment is designed to swing up and down on the back end of the base while a protrusion 20P at the front end engages a cam channel 33 in the cam gear 30. As described above, this cam channel 33 comprises top and bottom horizontal channels 33a and 33c, and a diagonal channel 33b connecting these horizontal channels (see FIG. 24 to FIG. 29). The vertical position of the front of the traverse base 20 is determined by what part of these three channels 33a to 33c the protrusion 20P is engaged with, due to the direction and amount of cam gear 30 rotation. The traverse base 20 therefore swings up and down pivoting around the back edge of the traverse base 20 according to the direction and distance of cam gear 30 rotation.

It will thus be obvious that the traverse base 20 is supported to swing vertically on a first end thereof relative to the drive base 10. More specifically, the cam gear 30 is turned by power transferred from the loading drive gear set 61, causing the second end of the traverse base 20 to move up or down such that the front of traverse base 20 swings up or down relative to the drive base 10 (see FIGS. 6 and 7). Drive power from one motor, the second motor 4, is thus used to swing the traverse base 20 up and down, and therefore to raise or lower the turntable 5, and spin the disc 9 in conjunction therewith.

Figure 13:
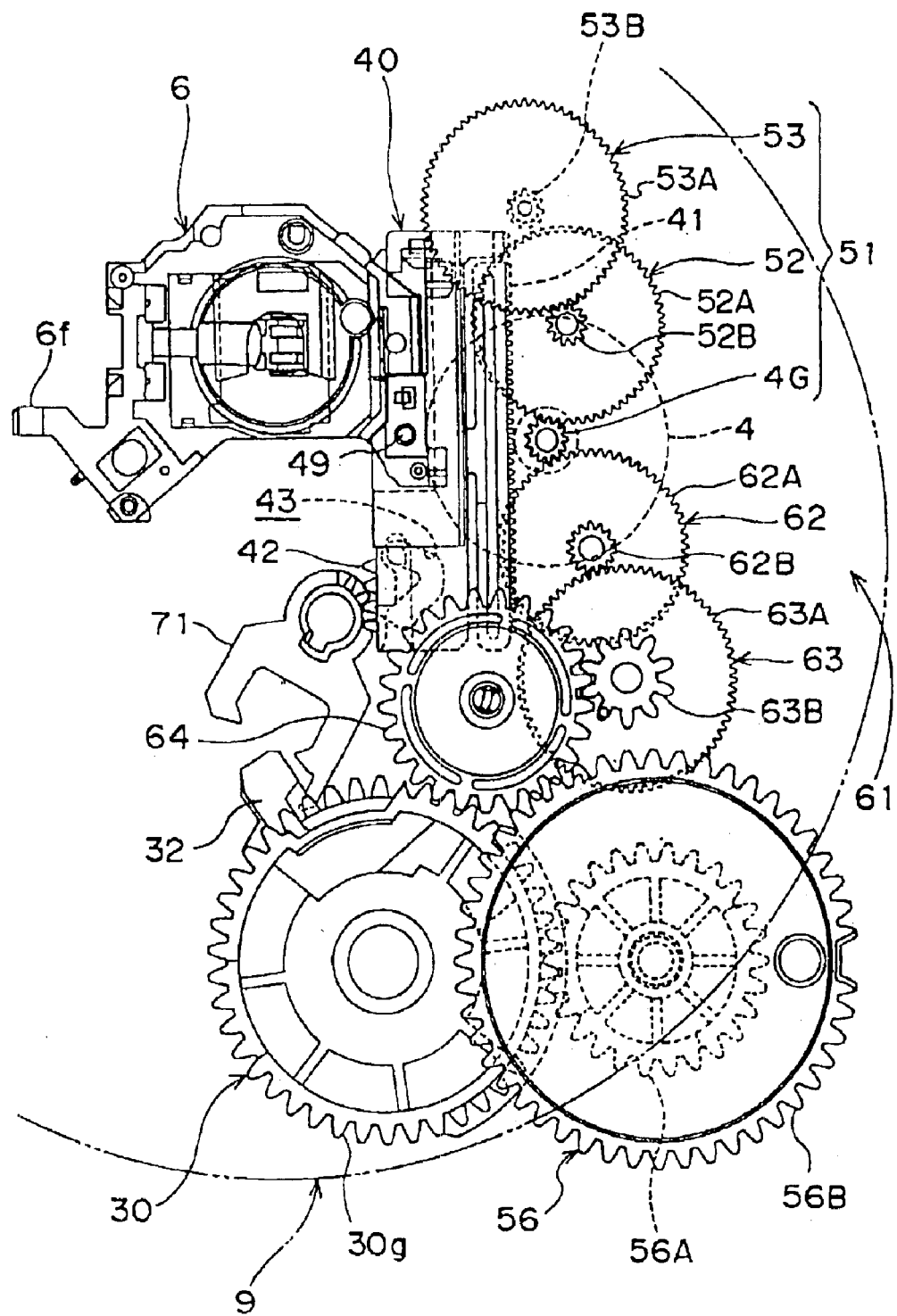
Figure 18:
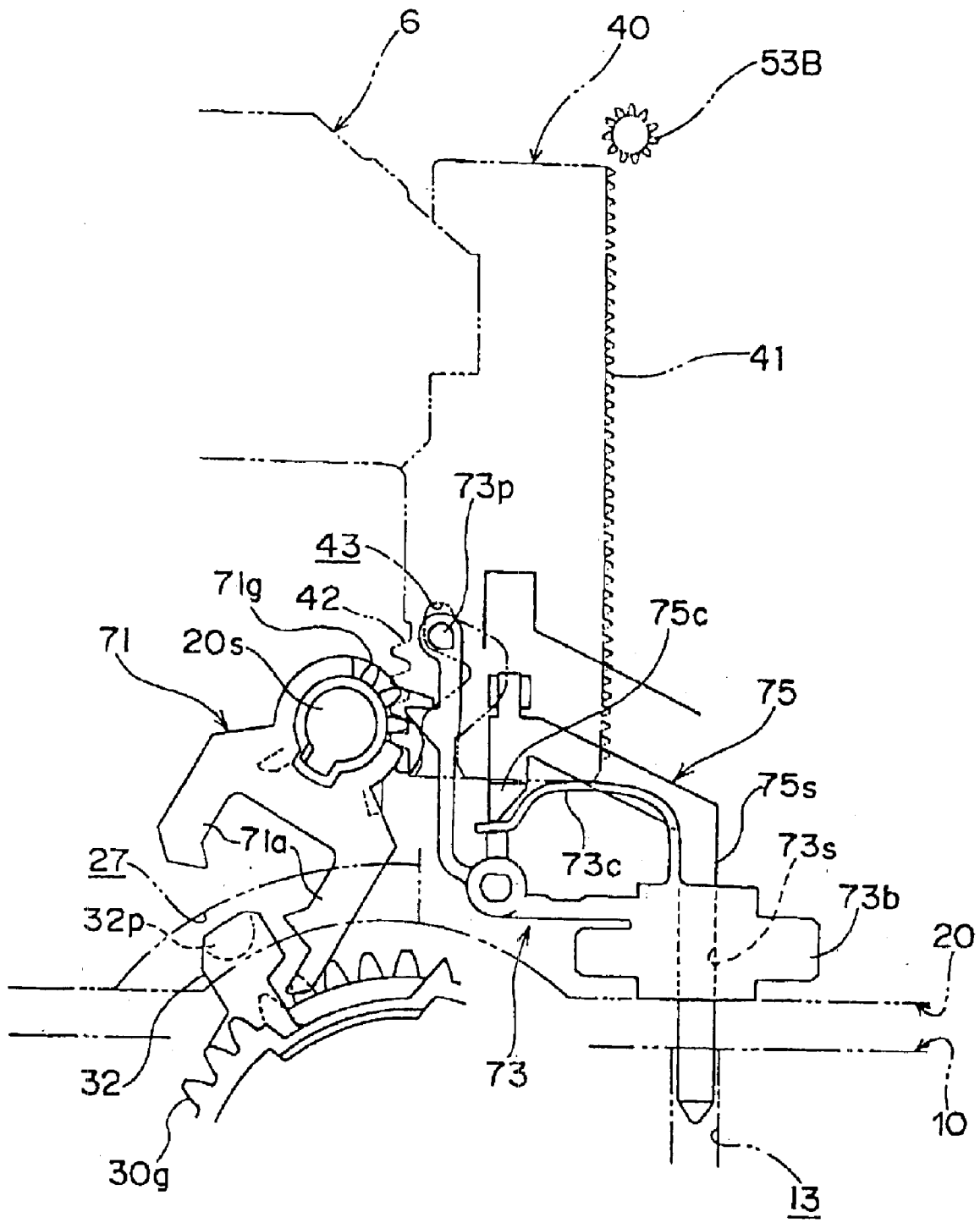

When the cam gear 30 moves further counterclockwise as shown in FIG. 13 and FIG. 18, the position at which the protrusion 20P of traverse base 20 engages the cam channel 33 moves from the top horizontal channel 33a through the diagonal channel 33b to the bottom horizontal channel 33c.

Figure 9:
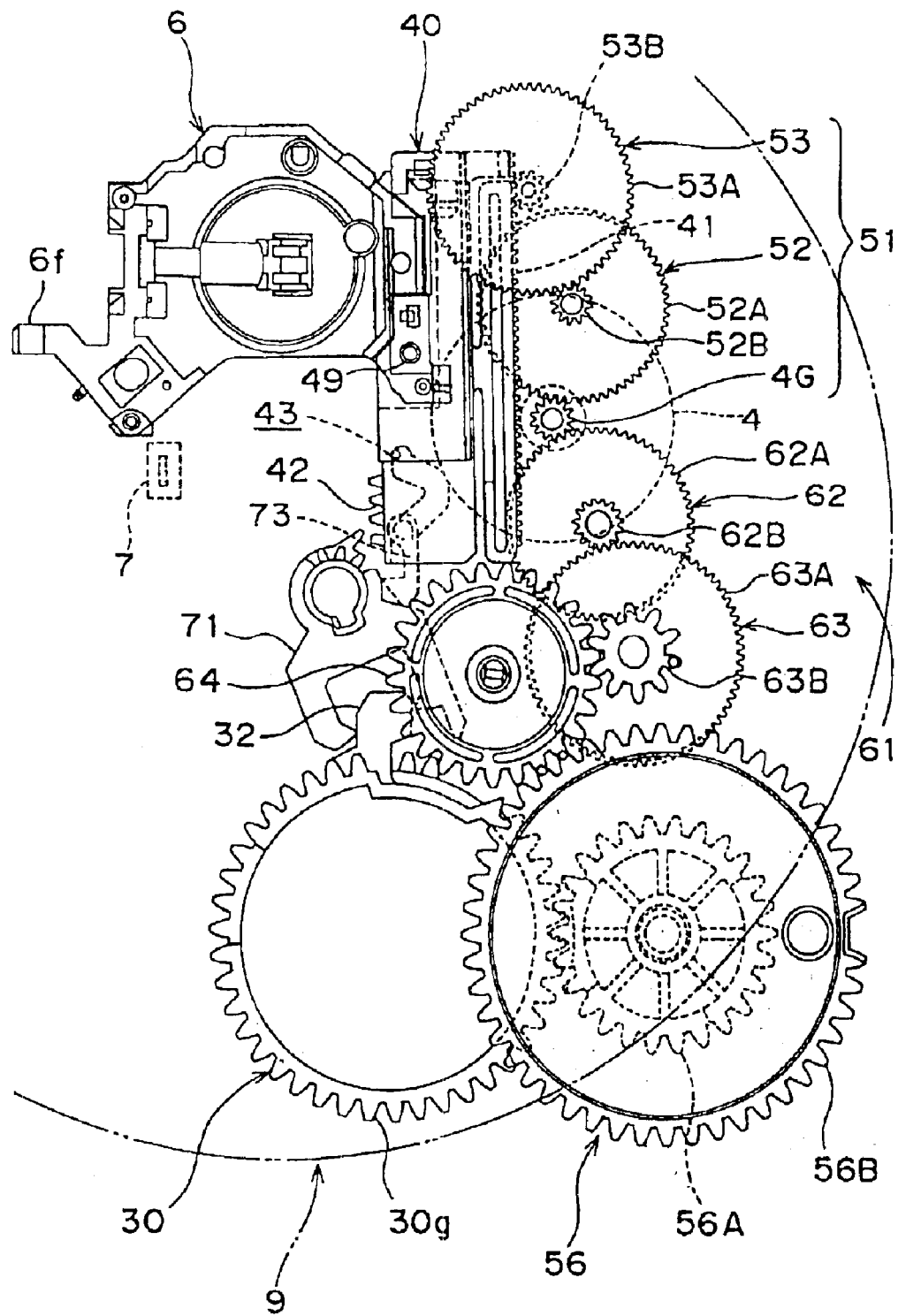
FIG. 9 to FIG. 13 are a sequence of plan views showing the operation of a drive mechanism in the optical disk drive shown in FIG. 1.

When the traverse base 20 is positioned as shown in FIG. 9 and FIG. 14, the protrusion 20P engages top horizontal channel 33a, and the traverse base 20 is held as shown in FIG. 6 parallel to the drive base 10 with the top of the traverse base 20 substantially parallel to the top of the drive base 10. The disc 9 can thus be clamped and held level between the turntable 5 and the damper 96.

When the feed rack 40 moves more than a specific distance forward as shown in FIGS. 10 to 13 and FIGS. 15 to 18, the cam gear 30 begins to turn, and the front protrusion 20P of the traverse base 20 passes through the diagonal channel 33b to engage the bottom horizontal channel 33c of cam channel 33.

This results in the traverse base 20 swinging down on the back (first) end thereof so that it is inclined with respect to the drive base 10 as shown in FIG. 7. This movement of the traverse base 20 also lowers the turntable 5 to the same downward incline. As a result, a disc 9 can be drawn to a position above the turntable 5 from outside the disk drive 1, or can be ejected from above the turntable 5 to outside the disk drive 1, without the damper 96 or turntable 5 interfering with disc 9 loading or unloading.

When the traverse base 20 is thus inclined down with respect to the drive base 10 to a specific position (the position at which the front protrusion 20P of the traverse base 20 passes through the diagonal channel 33b and engages the bottom horizontal channel 33c of cam channel 33), the teeth 30g of cam gear 30 engage the tray drive gear 56 of the disk loading mechanism. The tray 55 is thus driven with the traverse base 20 reliably swung to a downward position.

It is therefore possible to reliably avoid interference between the tray 55 (and disc 9 thereon) and the turntable 5 when the tray is driven (that is, when a disk is loaded or unloaded).

When the traverse base 20 is thus inclined (see FIG. 13, FIG. 18, and FIG. 7), the third loading gear 64 is also inclined and engaged with the teeth 30g of cam gear 30. As noted above and shown in FIG. 29, these teeth 30g have a profile in longitudinal section that is curved or inclined with respect to the axis Lg of the cam gear 30. As a result, gears 64 and 30g can engage reliably and smoothly.

Furthermore, while the feed rack 40 (that is, the optical pickup 6) moves to the front and the traverse base 20 is inclining, the front edge of the feed rack 40 contacts and pushes forward on the back of the extension 75c of positioning rod 75 in conjunction with the forward movement of the feed rack 40 as shown in FIGS. 14 to 18. This causes the regulating rod 75s of the positioning rod 75 to move forward guided by the guide slot 73s in the base 73b of rocking lever 73. Then, as noted above, the regulating rod 75s fits into the positioning channel 13 in drive base 10, and thus positions the traverse base 20 side to side to the drive base 10.

When the feed rack 40 moves in the opposite direction to the back, the force of spring part 73c moves the positioning rod 75 to the back. This is because the front of the extension 75c of positioning rod 75 contacts the spring part 73c of the rocking lever 73, and the spring part 73c thus constantly urges the positioning rod 75 toward the back.

When the traverse base 20 is held substantially parallel to the drive base 10 with the tops thereof substantially flush, the drive base 10 and traverse base 20 are positioned front-back to each other by engagement of the engaging protrusion 32p of hook 32 on cam gear 30 with the cam channel 27 in the front of traverse base 20.

Figure 19:
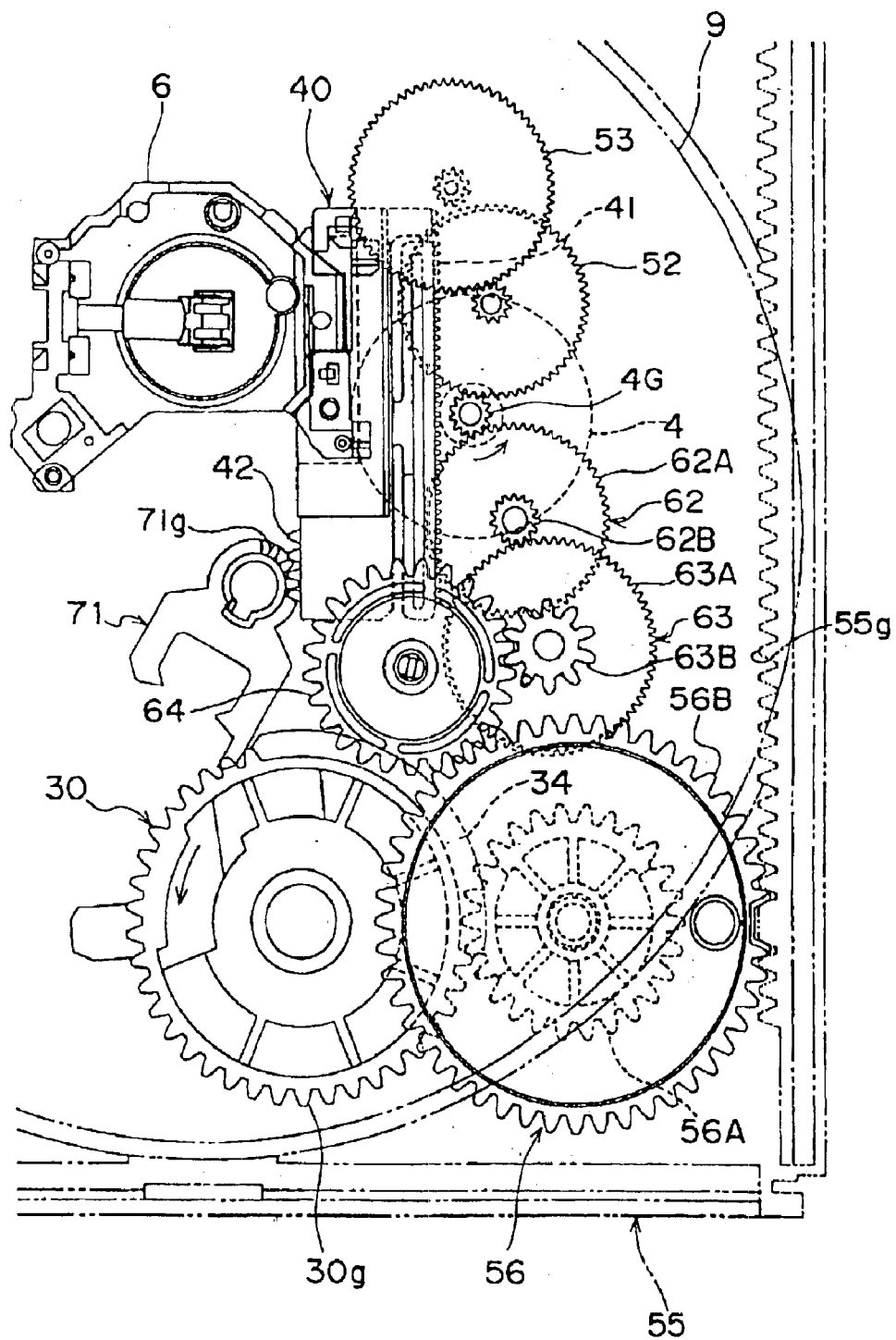
FIG. 19 is an enlarged plan view showing the engagement of the tray and tray drive gear.
Figure 20:
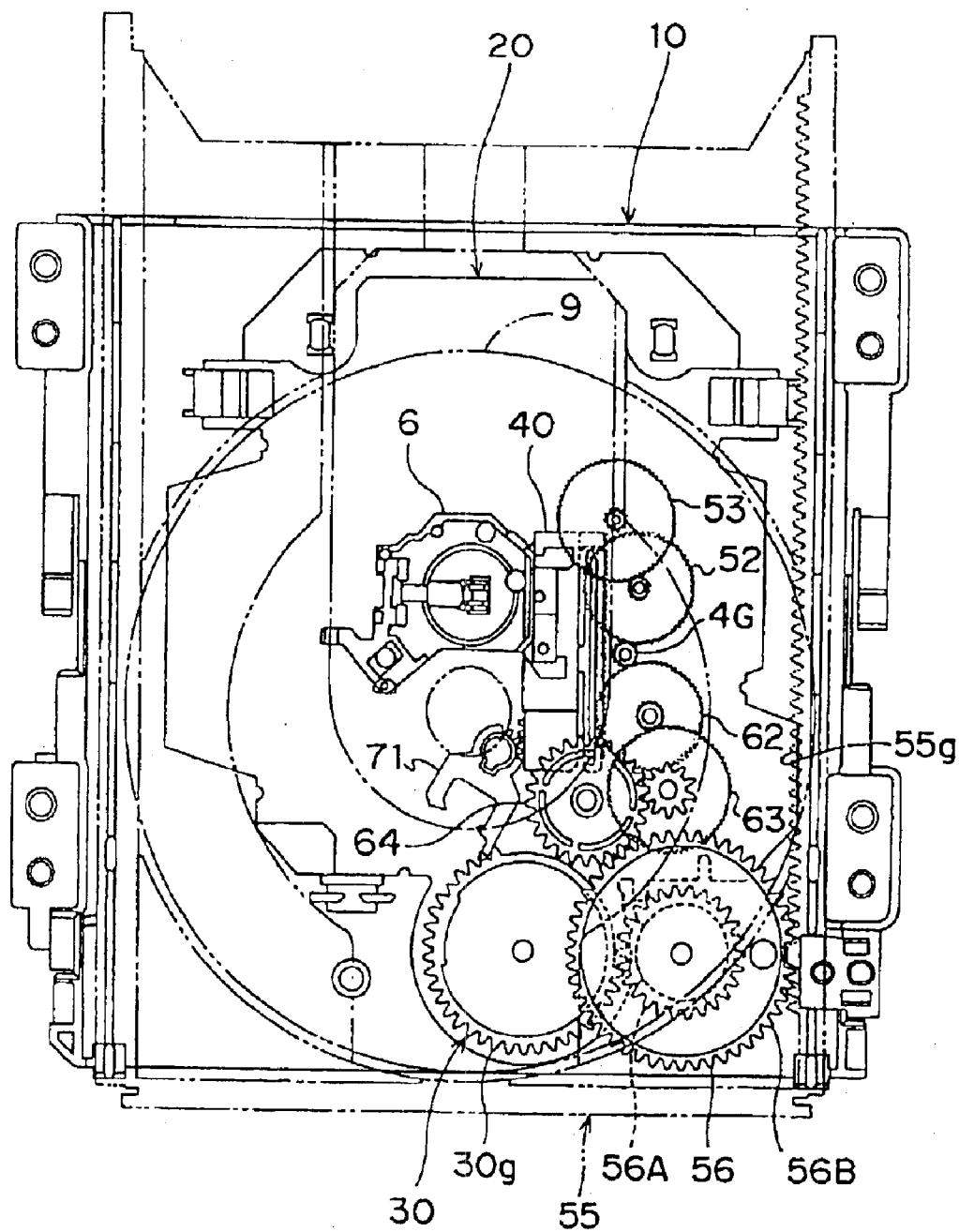
FIG. 20 is a plan view of the optical disk drive with the tray stored inside the drive.
Figure 21:
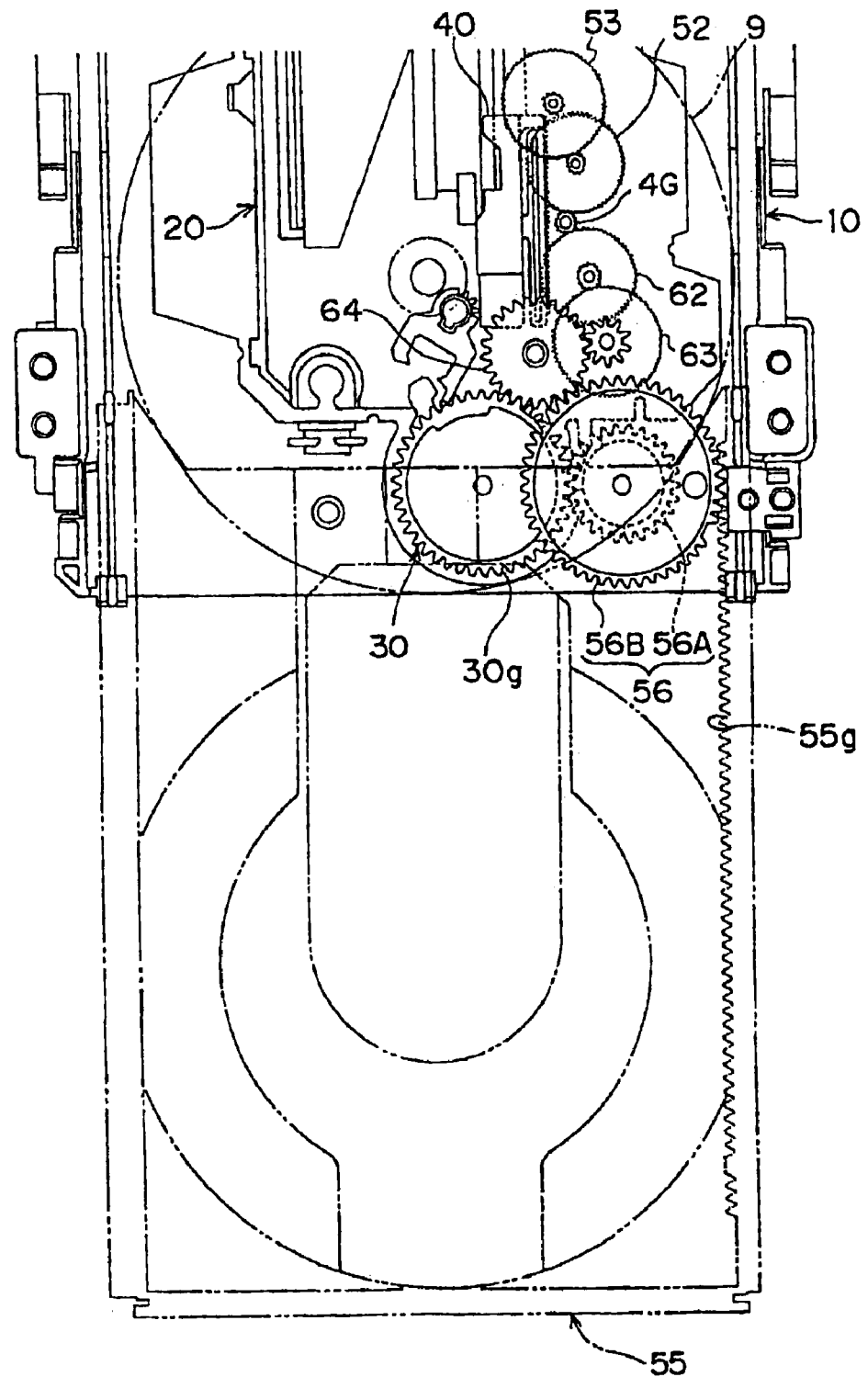
FIG. 21 is a plan view of the optical disk drive with the tray moved outside the drive.
Figure 22:
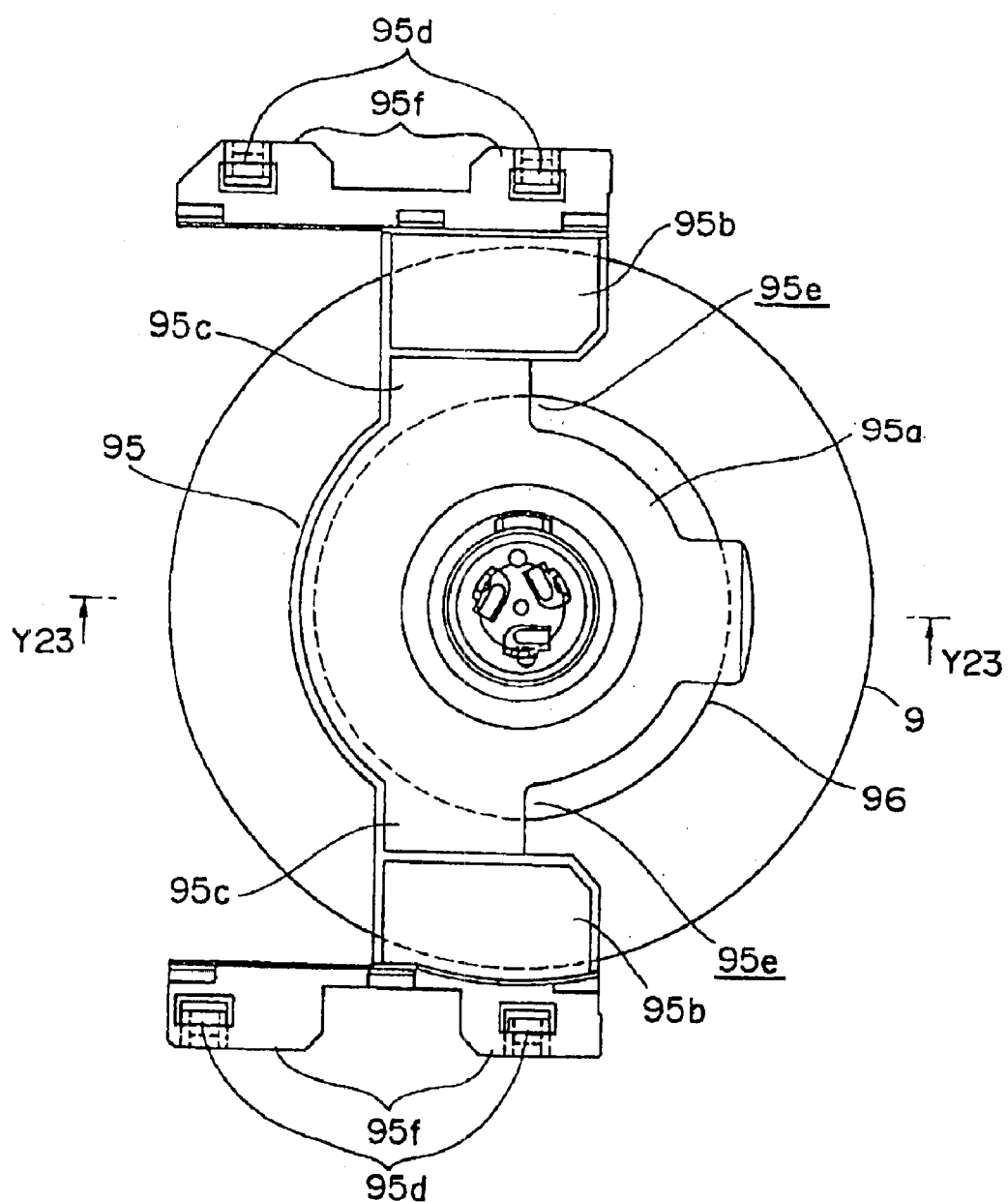
FIG. 22 is an enlarged plan view showing the disk clamping mechanism of the optical disk drive.
Figure 23:
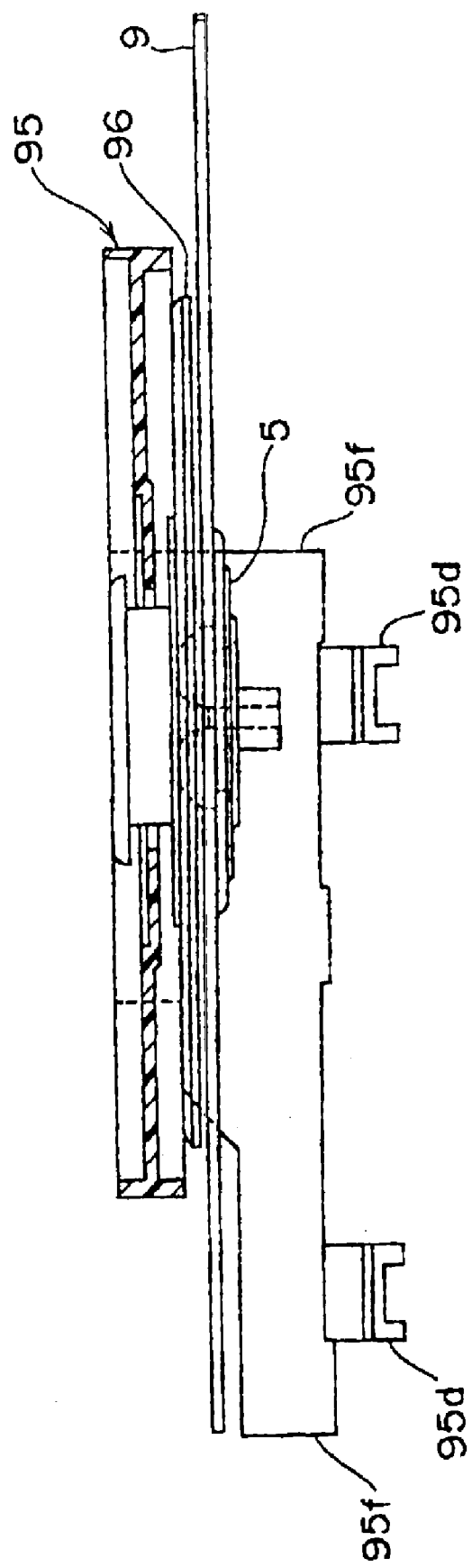
FIG. 23 is a section view through line Y23—Y23 in FIG. 22.
Figure 24:
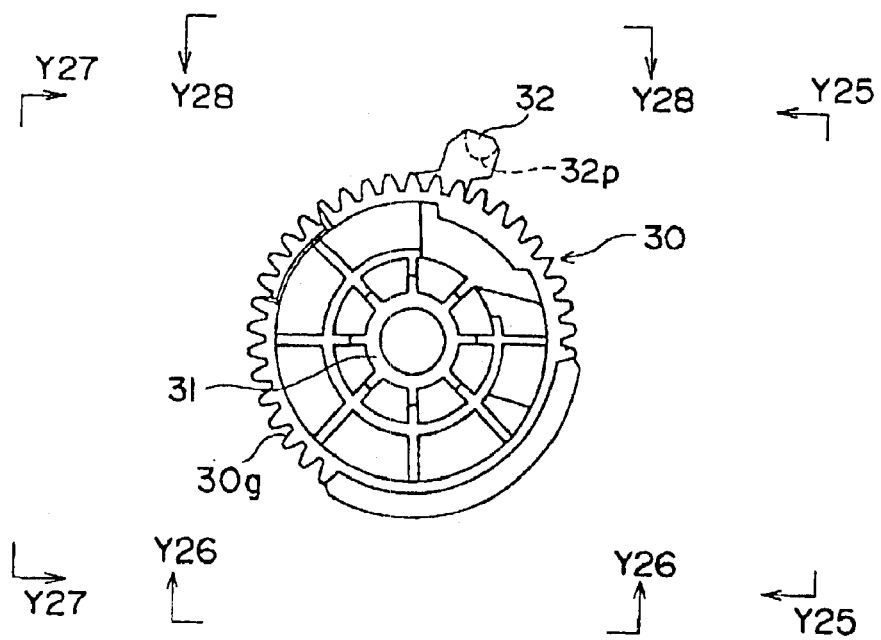
FIG. 24 is a plan view of the cam gear of this drive mechanism.
Figure 25:
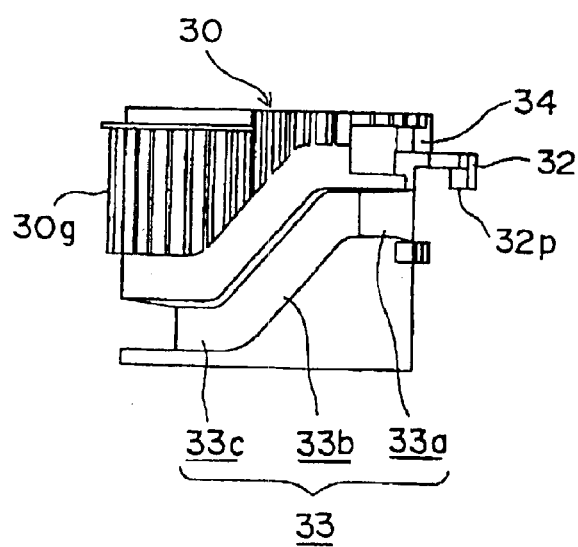
FIG. 25 is a side section view through line Y25—Y25 in FIG. 24.
Figure 26:
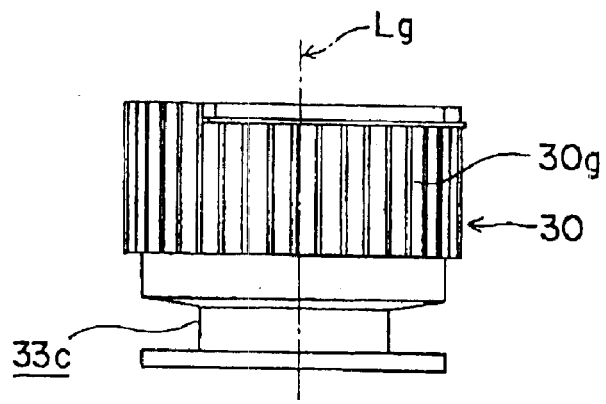
FIG. 26 is a side section view through line Y26—Y26 in FIG. 24.
Figure 27:
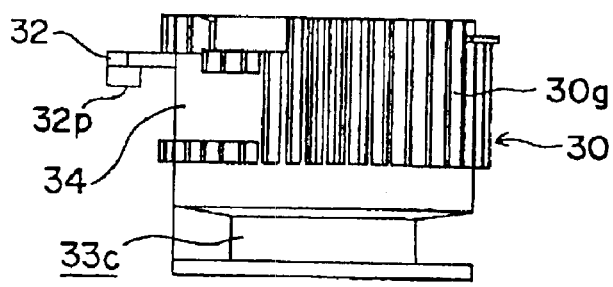
FIG. 27 is a side section view through line Y27—Y27 in FIG. 24.
Figure 28:
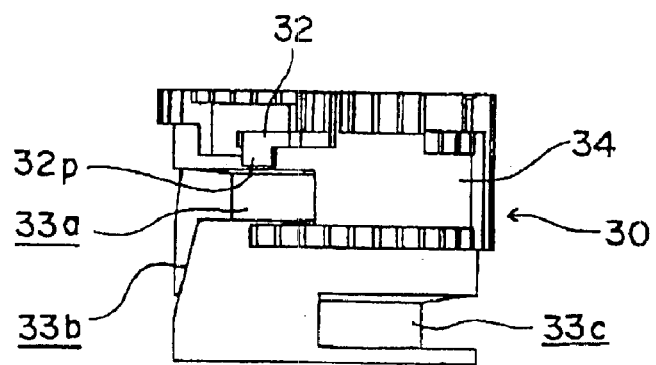
FIG. 28 is a side section view through line Y28—Y28 in FIG. 24.

FIG. 19 and FIG. 20 show the state in which the motor gear 4G is driven further in the same direction (counterclockwise) by the second motor 4, and cam gear 30 is turned further counterclockwise by way of intervening loading drive gear set 61. The input gear 56A of tray drive gear 56 does not engage the teeth 30g of traverse base 20, and is positioned to the smooth part 34, when the drive is in the states shown in FIGS. 9 to 13. Rotation of cam gear 30 is therefore not transferred to the tray drive gear 56, and the tray drive gear 56 does not turn. However, when the cam gear 30 turns to the position shown in FIG. 19 and FIG. 20, teeth 30g of cam gear 30 begin to engage input gear 56A of tray drive gear 56, and tray drive gear 56 turns in conjunction with rotation of the cam gear 30. The tray 55 is then pulled to the front as shown in FIG. 21 by way of output gear 56B of tray drive gear 56 and the tray rack teeth 55g engaged therewith.

It should be noted that drawing the tray 55 from inside the disk drive 1 to outside the drive (i.e., unclamping the disc 9 and ejecting the disc 9 from a signal reproduction state) is described above. To draw the tray 55 from outside to inside the disk drive 1, the second motor 4 is driven in the opposite direction by the motor control circuit of the circuit board 2 so that the motor gear 4G begins to turn clockwise. As a result, carrying the optical disc 9 into the disk drive 1, clamping the disc, and preparing for signal reproduction are accomplished as a sequence of actions.

As described above, a disk drive according to this preferred embodiment of the present invention comprises a drive base 10 and separate traverse base 20 to which a turntable 5 is attached, and the traverse base 20 is supported so as to swing up and down on the drive base 10. By driving a single motor (second motor 4) continuously in a forward direction (first direction of rotation) or opposite direction, moving an optical pickup 6, raising and lowering the turntable 5, and transporting a disc 9 can be accomplished substantially continuously in this order, or substantially continuously in the opposite order. It is therefore possible when loading or unloading a disc 9 to avoid interference with the turntable 5 without moving the disc 9 up or down. Unlike with a conventional disk drive, it is therefore not necessary to provide a disk holder for lifting the disk.

Furthermore, it is also possible to secure (clamp) and release (unclamp) the disc 9 to or from the turntable 5 using the operation whereby the traverse base 20 to which the turntable 5 is attached is swung vertically on the drive base 10. Therefore, unlike with a conventional disk drive, it is not necessary to drive the clamping mechanism (chucking plate) up and down.

Furthermore, because a single motor (second motor 4) is used to move the optical pickup 6, raise and lower the turntable 5, and transport the disc 9, the disk drive 1 can be operated using a total of two motors, that is, the second motor 4 and a spindle motor (first motor) 3 for rotationally driving the turntable 5. By thus reducing the number of motors used, disk drive 1 construction is simplified, and good operation of the component parts can be more stably maintained.

ADVANTAGES OF THE PRESENT INVENTION

In an optical disk drive according to a first aspect of the present invention, both a first base comprising a base frame of the disk drive, and a second base separate from the first base are provided. The second base is supported to move or swing vertically relative to the first base. A single motor (the above-noted second motor) can be driven continuously forward (in a first direction of rotation) or in the opposite direction to move the optical pickup, raise or lower the turntable, and move the optical disc substantially continuously in this sequence, or substantially continuously in reverse direction in reverse sequence. It is therefore possible to avoid interference between the turntable and disk when loading and unloading a disk without moving the disk up or down. Unlike with a conventional disk drive, it is therefore not necessary to provide a disk holder for lifting the disk.

Furthermore, it is also possible to secure (clamp) and release (unclamp) the disc to or from the turntable using the operation whereby the second base to which the turntable is attached is swung vertically on the first base. Therefore, unlike with a conventional disk drive, it is not necessary to drive the clamping mechanism (chucking plate) up and down.

Furthermore, because a single motor (the second motor) is used to move the optical pickup, raise and lower the turntable, and transport the disc, the disk drive can be operated using a total of two motors, that is, the second motor and a first motor for rotationally driving the turntable. By thus reducing the number of motors used, disk drive construction is simplified, and good operation of the component parts can be more stably maintained.

In an optical disk drive according to a second aspect of the present invention, the second base is disposed inside an opening in the first base, and is supported so that it can swing vertically pivoting around one end thereof relative to the first base. More specifically, the cam gear is rotated by drive power transferred from the loading drive gear set, and the second end side of the second base is raised or lowered in conjunction with cam gear rotation. As a result, the second base is moved up or down with respect to the first base pivoting around the one end side of the second base.

In addition to the benefits achieved by the first aspect of the invention, it is also possible to use drive power from a single motor (the second motor) to drive and pivot the second base up and down with respect to the first base (that is, raising and lowering the turntable), and to transport (load and unload) the disk.

In an optical disk drive according to a third aspect of the present invention, the profile of the outside gear part of the cam gear as seen in longitudinal section is an arc or a line approaching said arc. This arc follows a path of vertical circular motion through which the final output gear of the loading drive gear set travels in conjunction with the swinging movement of the second base.

In this case, the final output gear of the loading drive gear set positively engages the outside gear part of the cam gear when the final output gear swings up or down in conjunction with the swinging movement of the second base.

In an optical disk drive according to a fourth aspect of the present invention, a protrusion is arranged at the second end side of the second base, and this other end side of the second base is positioned vertically as a result of this protrusion engaging a cam channel in the cam gear.

Therefore, in addition to the benefits achieved by the above aspects of the invention, it is also possible to reliably determine and precisely position the second end side of the second base vertically with respect to the first base. As a result, components on the first base and components on the second base can be precisely and reliably engaged with corresponding components.

In an optical disk drive according to a fifth aspect of the present invention, the outside gear part of the cam gear engages the tray drive gear of the disk loading mechanism when the second base swings downward to a specific position relative to the first base. The tray is thus driven after the second base has positively swung down from the first base.

Therefore, in addition to the benefits achieved by the above aspects of the invention, it is also possible to reliably avoid interference between the tray (that is, the disk on tray) and the turntable when the tray is driven (that is, when the disk is transported).

In an optical disk drive according to a sixth aspect of the present invention, the feed rack can be moved to a specific position farther to the inside circumference side of the disc after moving the optical pickup to an inside circumference edge position of the data signal recording area of the optical disc. By moving to this specific position at the inside circumference side, or moving from said specific position at the inside circumference side to the outside circumference side of the disc, the feed rack switches the drive power transfer path of the second motor.

Therefore, in addition to the benefits achieved by the above aspects of the invention, it is also possible to use a single motor (the second motor) to drive signal reading operations of the optical pickup, and to switch the drive power transfer path of the second motor.

In an optical disk drive according to a seventh aspect of the present invention, a regulating rod is driven to project from the second end side of the second base as a result of the feed rack moving beyond a specific position to the second end side. The regulating rod thus fits into the positioning channel in the first base, and thereby determines the lateral position of the second base with respect to the first base perpendicular to the direction of feed rack travel.

Therefore, in addition to the benefits achieved by the above aspects of the invention, it is also possible to precisely and positively position the second end side of the second base laterally with respect to the first base. In addition, components on the first base and components on the second base can be precisely and reliably engaged with corresponding components. Furthermore, involving the feed rack to the second end side of the second base and positioning the second base can be interlinked using drive power from a single motor (the second motor).

In an optical disk drive according to an eighth aspect of the present invention, the second base can additionally be positively positioned with respect to the first base in the direction of feed rack travel as a result of a hook part arranged at the cam gear engaging a curved channel in the second base. As a result, components on the first base and components on the second base can be precisely and reliably engaged with corresponding components.

In addition to the benefits achieved by the above aspects of the invention, the second base is not rigidly supported on the first base as in a conventional disk drive, but is instead supported so as to float on the first base within limits determined by the flexibility of the damping members, in an optical disk drive according to a ninth aspect of the present invention.

As a result, strong shocks or vibrations to which the optical disk drive is exposed can be absorbed by the damping members, and thus prevented from being transferred directly from the first base to drive parts on the second base. This means that the durability of the disk drive can be improved with respect to shock and vibration.

Furthermore, by supporting the second base so that it can float on the first base within the range of damping member flexibility, it is possible to adjust the relative positions of components on the first base and second base within the floating range of the second base. Compared with a conventional disk drive in which the components are rigidly supported, it is therefore possible to require less precision in parts manufacture and assembly, and productivity can therefore be improved in the manufacturing process.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disk drive comprising:
   a first base portion forming a body of said optical disk drive;
   a second base portion separate from said first base portion, said second base portion including:
   a turntable for rotatably supporting an optical disc;
   a first motor for rotating said turntable;
   an optical pickup for at least one of writing a data signal to the optical disc supported on said turntable and reading a data signal recorded on the optical disc; and
   a pickup drive mechanism for moving said optical pickup bidirectionally between an inside circumference of the optical disc and an outside circumference of the optical disc;
   a raising and lowering mechanism supporting said second base portion, and operable to raise and lower said second base portion;
   a disk loading mechanism for moving the optical disc bidirectionally along a disc insertion path between a first position, whereat the optical disc is positioned above said turntable, and a second position, whereat the optical disc is positioned outside the disk drive, said disk loading mechanism including: a loading drive mechanism for driving said disk loading mechanism;

a second motor mounted to said second base portion, said second motor being operable to move in a forward rotation direction and a reverse rotation direction, and being operable to drive said pickup drive mechanism and drive said loading drive mechanism so as to thereby move said optical pickup bidirectionally via said pickup drive mechanism, to thereby move the optical disk bidirectionally via said disk loading mechanism, and to thereby raise and lower said second base portion by driving said raising and lowering mechanism via said loading drive mechanism, said second base portion and said disk loading mechanism being arranged so that a moving operation of said optical pickup, a raising and lowering operation of said turntable of said second base portion, and a moving operation of the optical disc can be substantially continuously performed in this sequence by driving said second motor continuously in the forward rotation direction, and so that the moving operation of said optical pickup, the raising and lowering operation, and the moving operation of said optical disc can be performed in a reverse direction and in reverse sequence substantially continuously by driving said second motor continuously in the reverse rotation direction;

a drive power gear path between said first base portion and said second base portion, and including a gear set having a plurality of gears for supplying drive power from said second motor to said loading drive mechanism and said pickup drive mechanism; and a drive power path switching mechanism for switching a drive power supplied by said second motor between a path supplying power to said loading drive mechanism and a path supplying power to said pickup drive mechanism.

2. The optical disk drive of claim 1, wherein said raising and lowering mechanism comprises a cam gear with an outer circumferential surface, said cam gear having a cam channel and a gear teeth portion formed in said outer circumferential surface, said second base portion having a first end pivotally connected to said first base portion so as to be operable to swing vertically about said first end relative to said first base portion, said gear set including an outer gear engaging said gear teeth of said cam gear so as to rotate said cam gear to thereby raise and lower a second end of said second base portion via said cam channel.

3. The optical disk drive of claim 2, wherein said second base portion has a protrusion extending from said second end thereof and extending into said cam channel of said cam gear, said cam channel having an upper horizontal section, a lower horizontal section, and an oblique section connecting said upper horizontal section and said lower horizontal section such that said protrusion is raised and lowered by contacting sidewalls of said cam channel during rotation of said cam gear.

4. The optical disk drive of claim 2, wherein said cam gear is substantially cylindrical and is arranged such that an axis of rotation of said cam gear is substantially perpendicular to the disc insertion path along which the optical disc is moved.

5. The optical disk drive of claim 2, wherein a profile of an outside gear part of said cam gear as seen in longitudinal section is an arc or a line approaching said arc, said arc following a path of vertical circular motion through which said output gear of said gear set travels in conjunction with the swinging movement of said second base.

6. The optical disk drive of claim 2, wherein a protrusion is arranged at said second end of said second base portion, said second end of said second base portion being positioned vertically by engaging said protrusion in said cam channel.

7. The optical disk drive of claim 2, wherein said disk loading mechanism further includes a tray for supporting the optical disc during movement between the first position and the second position, and a tray drive gear for driving the tray, said gear teeth portion of said cam gear being operable to engage said tray drive gear when said second base portion swings downward to a specific position relative to said first base portion.

* * * * *

UNITED STATES PATENT AND TRADEMARK OFFICE
CERTIFICATE OF CORRECTION

PATENT NO. : 6,886,176 B2
DATED : April 26, 2005
INVENTOR(S) : Yuji Ariyoshi et al.

It is certified that error appears in the above-identified patent and that said Letters Patent is hereby corrected as shown below:

Title page,
Item [56], References Cited, U.S. PATENT DOCUMENTS, please add the following:
-- 4,701,901    10/87    Imai………...369/75.2
   5,123,005    06/92    Kurosu……...369/77.1 --

Column 22,
Line 65, please delete ":" between "including" and "a loading".

Signed and Sealed this

Twenty-third Day of August, 2005

JON W. DUDAS
*Director of the United States Patent and Trademark Office*